(12) United States Patent
Hart

(10) Patent No.: US 12,533,022 B2
(45) Date of Patent: Jan. 27, 2026

(54) RETINAL VITAL SIGN ASSESSMENT

(71) Applicant: Welch Allyn, Inc., Skaneateles Falls, NY (US)

(72) Inventor: Allen R. Hart, Knoxville, TN (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 483 days.

(21) Appl. No.: 17/810,378

(22) Filed: Jul. 1, 2022

(65) Prior Publication Data

US 2023/0016417 A1    Jan. 19, 2023

Related U.S. Application Data

(60) Provisional application No. 63/220,786, filed on Jul. 12, 2021.

(51) Int. Cl.
| | |
|---|---|
| *A61B 3/12* | (2006.01) |
| *A61B 3/113* | (2006.01) |
| *A61B 3/14* | (2006.01) |
| *A61B 5/0205* | (2006.01) |
| *A61B 5/021* | (2006.01) |
| *A61B 5/1455* | (2006.01) |
| *G16H 10/60* | (2018.01) |
| *G16H 50/30* | (2018.01) |
| *A61B 5/024* | (2006.01) |

(52) U.S. Cl.
CPC ............ *A61B 3/12* (2013.01); *A61B 3/113* (2013.01); *A61B 3/145* (2013.01); *A61B 5/0205* (2013.01); *A61B 5/021* (2013.01); *A61B 5/14552* (2013.01); *G16H 10/60* (2018.01); *G16H 50/30* (2018.01); *A61B 5/02444* (2013.01)

(58) Field of Classification Search
CPC .......... A61B 3/12; A61B 3/113; A61B 3/145; A61B 5/0205; A61B 5/14552; A61B 5/021; A61B 5/02444; G16H 10/60; G16H 50/30
See application file for complete search history.

(56) References Cited

U.S. PATENT DOCUMENTS

| | | |
|---|---|---|
| 9,028,421 B2 | 5/2015 | Fujii |
| 10,089,809 B1 * | 10/2018 | Daly ............... G07C 9/00174 |
| 10,529,061 B2 | 1/2020 | Wang |
| 10,595,732 B2 | 3/2020 | Jones |
| 10,722,126 B2 | 7/2020 | Chang |

(Continued)

FOREIGN PATENT DOCUMENTS

| | | |
|---|---|---|
| CN | 107427238 A | 12/2017 |
| EP | 3510917 A1 | 7/2019 |

(Continued)

OTHER PUBLICATIONS

Labib, Bisant A., "Why SVP Matters", Review of Optometry, 3 pages (Nov. 2018). (Year: 2018).*

(Continued)

*Primary Examiner* — Catherine M Voorhees
(74) *Attorney, Agent, or Firm* — Merchant & Gould P.C.

(57) ABSTRACT

A fundus imager includes a camera for capturing eye fundus images, and a display for displaying the eye fundus images. The fundus imager captures an eye fundus video using the camera, performs an analysis on the eye fundus video to generate a signal, and calculates one or more vital signs from the signal.

17 Claims, 21 Drawing Sheets

(56) References Cited

U.S. PATENT DOCUMENTS

| | | | |
|---|---|---|---|
| 11,096,574 B2 | 8/2021 | Wang | |
| 2016/0287071 A1 | 10/2016 | Tan | |
| 2018/0064335 A1* | 3/2018 | Rutschman | A61B 3/145 |
| 2018/0078216 A1* | 3/2018 | Baker | A61B 3/0025 |
| 2018/0092530 A1* | 4/2018 | Hart | A61B 3/0075 |
| 2019/0159707 A1 | 5/2019 | Albuquerque | |
| 2020/0160521 A1* | 5/2020 | Wang | G06V 10/82 |
| 2020/0202529 A1* | 6/2020 | Hart | A61B 3/0025 |
| 2020/0320693 A1* | 10/2020 | Robertson | A61B 5/021 |
| 2021/0145359 A1* | 5/2021 | Hunt | A61B 5/4836 |
| 2021/0153741 A1* | 5/2021 | Berdahl | A61F 9/00 |
| 2023/0015951 A1* | 1/2023 | Hunter | A61B 3/1208 |

FOREIGN PATENT DOCUMENTS

| | | |
|---|---|---|
| EP | 3719808 A1 | 10/2020 |
| JP | 2018114031 A | 7/2018 |
| WO | 2018049041 A1 | 3/2018 |

OTHER PUBLICATIONS

European Extended Search Report in Application 22184461.6, mailed Dec. 12, 2022, 7 pages.
Labib, Bisant A., "Why SVP Matters," Review of Optometry, 3 pages (Nov. 2018).
MIT, "Video Magnification," 4 pages (Feb. 2021).

* cited by examiner

RETINAL VITAL SIGN ASSESSMENT

BACKGROUND

A fundus imager is a device that captures images of the eye fundus and other structures of the eye. The fundus images can be used to determine the health of the retina, and to screen for diseases such as retinopathy, macular degeneration, glaucoma, and papilledema.

Retinopathy is any damage to the retina of the eyes caused by abnormal blood flow, which may cause vision impairment. Frequently, retinopathy is an ocular manifestation of a systemic disease such as diabetes or hypertension. For example, diabetic retinopathy is a medical condition in which damage occurs to the retina due to diabetes. Hypertensive retinopathy is damage to the retina due to high blood pressure (i.e., hypertension).

SUMMARY

In general terms, the present disclosure relates to a technique within a fundus imager to screen for eye diseases closer to a single point of care. In one possible configuration, the fundus imager measures one or more vital signs while capturing an eye fundus image during an eye exam. The one or more vital signs are used along with the eye fundus image to provide a more comprehensive eye disease screening during and/or after the eye exam. Various aspects are described in this disclosure, which include, but are not limited to, the following aspects.

In one aspect, a fundus imager comprises a camera configured to capture one or more eye fundus images; a display configured to display the one or more eye fundus images; at least one processing device; and at least one computer readable data storage device storing software instructions that, when executed by the at least one processing device, cause the fundus imager to: capture an eye fundus video using the camera; perform an analysis on the eye fundus video to generate a signal; calculate one or more vital signs from the signal.

In another aspect, a method of eye disease screening comprises capturing an eye fundus video; performing video motion magnification on the eye fundus video; generating a signal from the video motion magnification; and analyzing the signal for retinal vein occlusion.

In another aspect, a method of eye disease screening comprises receiving an eye fundus video; performing video motion magnification on the eye fundus video; and determining one or more vital signs from the video motion magnification.

In another aspect, a method of eye disease screening comprises capturing an eye fundus video; performing video motion magnification on the eye fundus video; generating a signal from the video motion magnification; analyzing the signal for spontaneous venous pulsation; and when spontaneous venous pulsation is detected from the signal, ruling out a diagnosis for a pathological condition.

In another aspect, a system comprises at least one processing device; and at least one computer readable data storage device storing software instructions that, when executed by the at least one processing device, cause the at least one processing device to: obtain an eye fundus video; perform an analysis on the eye fundus video to generate a signal; and calculate one or more vital signs from the signal.

In another aspect, a method of eye disease screening, comprises performing video motion magnification on an eye fundus video; generating a signal from the video motion magnification; and calculating one or more vital signs from the signal.

In another aspect, a method of eye disease screening comprises performing video motion magnification on an eye fundus video; generating a signal from the video motion magnification; and analyzing the signal for retinal vein occlusion.

DESCRIPTION OF THE FIGURES

The following drawing figures, which form a part of this application, are illustrative of the described technology and are not meant to limit the scope of the disclosure in any manner.

DETAILED DESCRIPTION

Figure 1:
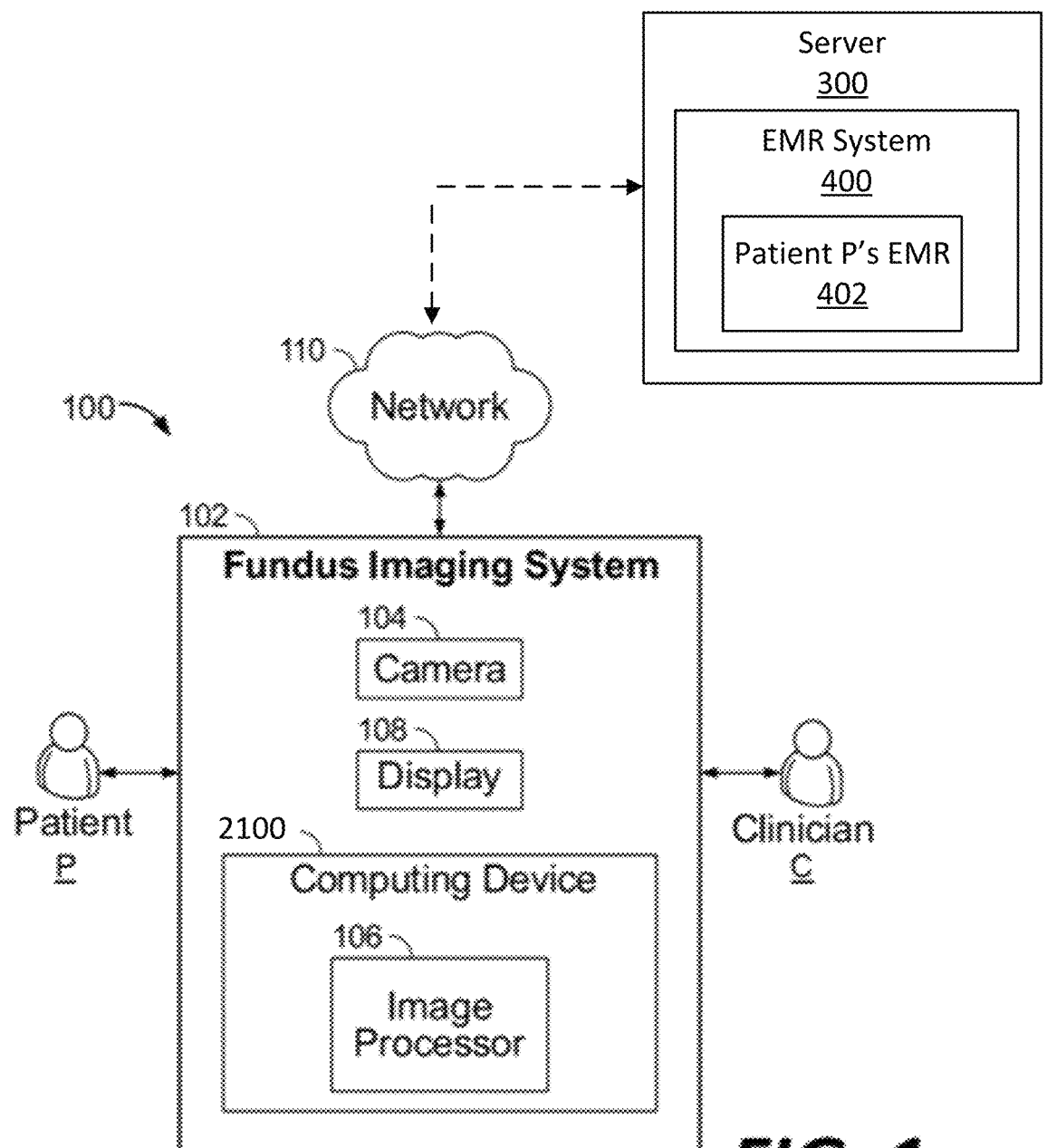
FIG. 1 schematically illustrates an example of a fundus imager that is operable by a clinician for capturing and viewing an eye fundus image of a patient.

FIG. 1 schematically illustrates an example of a fundus imager 100. As shown in FIG. 1, the fundus imager 100 is operable by a clinician C to capture and view fundus images of a patient P. As used herein, "fundus" refers to the eye fundus, which includes the retina, optic nerve, macula, vitreous, choroid, and posterior pole. Additionally, the fundus imager 100 can also be used to measure one or more vital signs of the patient P during an eye exam.

The fundus imager 100 can be used by the clinician C to screen, diagnose, and/or monitor the progression of one or more eye diseases, such as retinopathy, macular degeneration, glaucoma, papilledema, and the like. In certain aspects, the fundus imager 100 includes components similar to those that are described in U.S. patent application Ser. No. 16/415,019, filed on May 17, 2019, and in U.S. patent application Ser. No. 16/443,234, filed on Jun. 17, 2019, which are hereby incorporated by reference in their entireties.

In some examples, the clinician C is an eye care professional such as an optometrist or ophthalmologist who uses the fundus imager 100 to screen, diagnose, and/or monitor the progression of one or more eye diseases. In further examples, the clinician C can be a medical professional who is not trained as an eye care professional such as a general practitioner or primary care physician. In such examples, the fundus imager 100 can be used to screen for one or more eye diseases in a general practice medical office or other type of medical clinic.

In further examples, the clinician C can be a non-medical practitioner such as an optician who can help fit eyeglasses, contact lenses, and other vision-correcting devices such that the fundus imager 100 can be used to screen for one or more eye diseases in a retail clinic. In yet further examples, the fundus imager 100 can be used by the patient P to take fundus images of their eyes without assistance of the clinician C such that the fundus imager 100 can be used as a home device to screen, diagnose, and/or monitor for various types of eye diseases.

The fundus imager 100 can be configured to screen for eye diseases in a general practice medical office, retail clinic, or patient home by capturing one or more eye fundus images, detecting the presence of one or more conditions in the captured eye fundus images, and providing a preliminary diagnosis for an eye disease or a recommendation to follow up with an eye care professional. In some examples, the fundus imager 100 includes software algorithms that can analyze the captured eye fundus images to provide an automated diagnosis based on the detection of conditions in the captured eye fundus images. Thus, the fundus imager 100 can help users who are not trained eye care professionals to screen for one or more eye diseases.

One technique for fundus imaging requires mydriasis, or the dilation of the patient's pupil, which can be painful and/or inconvenient to the patient P. The fundus imager 100 does not require a mydriatic drug to be administered to the patient P before imaging, although the fundus imager 100 can image the fundus if a mydriatic drug has been administered.

The fundus imager 100 includes a computing device 2100 having at least an image processor 106. The fundus imager 100 further includes a camera 104 in communication with the computing device 2100, and a display 108 in communication with the computing device 2100. The camera 104 captures digital images of the eye fundus of the patient P, and the display 108 displays the captured digital images for viewing by the clinician C.

The camera 104 is in communication with the image processor 106. The camera 104 is a digital camera that includes a lens, an aperture, and a sensor array. The lens can be a variable focus lens, such as a lens moved by a step motor, or a fluid lens, also known as a liquid lens. The camera 104 is configured to capture images of the fundus one eye at a time. In other examples, the camera 104 is configured to capture an image of both eyes substantially simultaneously. In such examples, the fundus imager 100 can include two separate cameras, one for each eye.

The display 108 is in communication with the image processor 106. In the examples shown in the figures, the display 108 is supported by a housing 102. In other examples, the display 108 can connect to an image processor that is external of the fundus imager 100, such as a separate smart phone, tablet computer, or external monitor. The display 108 functions to display the images produced by the camera 104 in a size and format readable by the clinician C. In some examples, the display 108 is a liquid crystal display (LCD) or active matrix organic light emitting diode (AMOLED) display. In some examples, the display 108 is touch sensitive.

As shown in FIG. 1, the fundus imager 100 is connected to a network 110. The fundus imager 100 can upload eye fundus images and videos captured by the camera 104, as well as one or more measured vital signs, to a remote server 300 via the connection to the network 110. In at least some examples, the remote server 300 is a cloud server or similar type of server.

In some examples, the remote server 300 includes an electronic medical record (EMR) system 400 (alternatively termed electronic health record (EHR)). Advantageously, the remote server 300 can automatically store the eye fundus images and the vital signs of the patient P in an electronic medical record 402 of the patient P located in the EMR system 400.

In examples where the clinician C is not an eye care professional, such as when the fundus imager 100 is used for screening for eye diseases in general practice medical offices, in retail clinics, or in the patient P's home, the eye fundus images and the vital signs stored in the electronic medical record 402 of the patient P can be accessed by an overread clinician who is an eye care professional. Thus, the eye fundus images and the vital signs can be accessed and viewed on another device by a remotely located clinician. Thus, the clinician who operates the fundus imager 100 can be different from the clinician who evaluates the eye fundus images.

The network 110 may include any type of wireless network, wired network, or any combination of wireless and wired networks. Wireless connections can include cellular network connections. In some examples, a wireless connection can be accomplished directly between the fundus imager 100 and an external display device using one or more wired or wireless protocols, such as Bluetooth, Wi-Fi, and the like. Other configurations are possible.

The image processor 106 is coupled to the camera 104 and is configured to communicate with the network 110 and display 108. The image processor 106 can regulate the operation of the camera 104. Components of an example of the computing device 2100 are shown in more detail in FIG. 21, which will be described further below.

Figure 2:
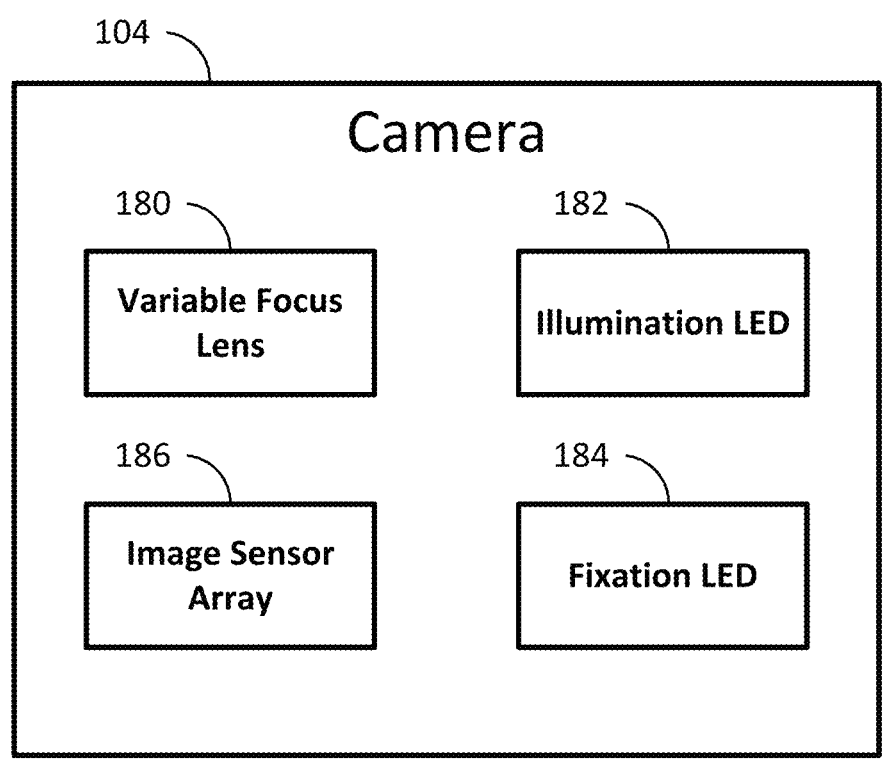
FIG. 2 schematically shows an example of a camera in the fundus imager of FIG. 1.
Figure 3:
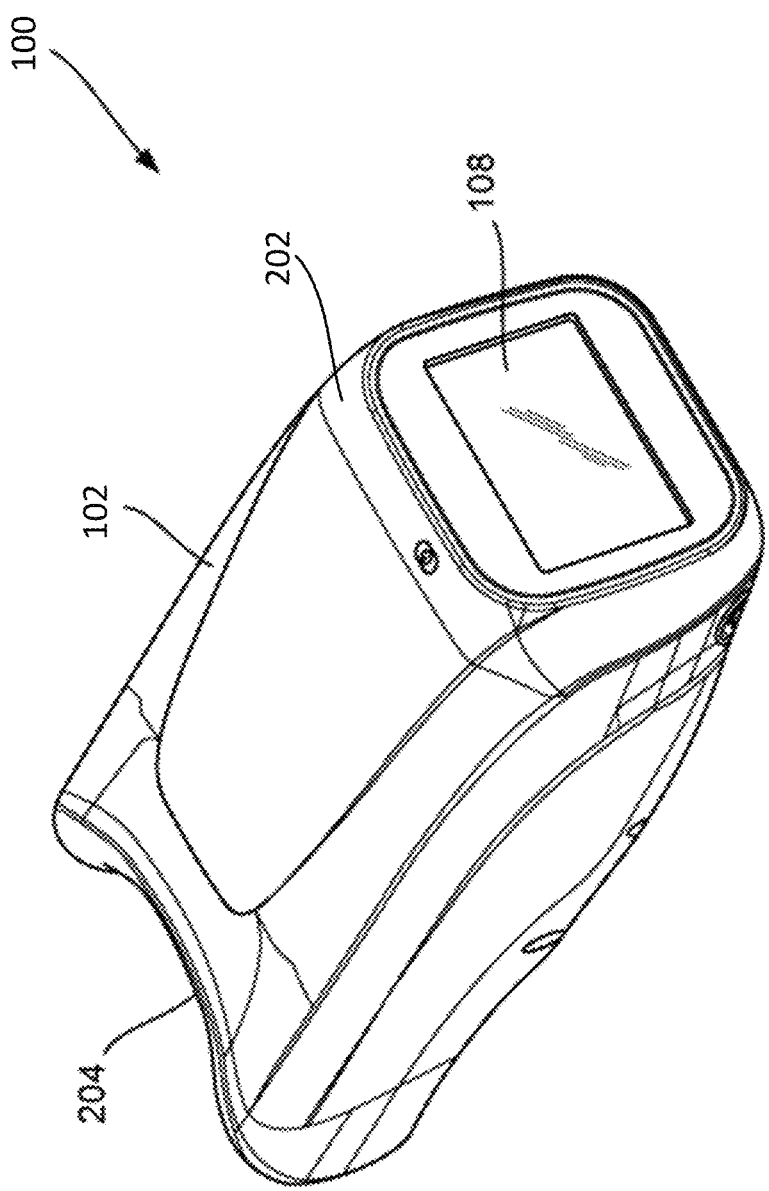
FIG. 3 is a top isometric view of an example of the fundus imager of FIG. 1, from the perspective of a clinician.

FIG. 2 schematically shows an example of the camera 104. As shown in FIG. 2, the camera 104 includes a variable focus lens 180, an illumination LED 182, an image sensor array 186, and a fixation LED 184. Each component is in electrical communication with, at least, the computing device 2100. Alternative examples can include more or fewer components.

In one example, the variable focus lens 180 is a liquid lens. A liquid lens is an optical lens whose focal length can be controlled by the application of an external force, such as a voltage. The lens includes a transparent fluid, such as water or water and oil, sealed within a cell and a transparent membrane. By applying a force to the fluid, the curvature of the fluid changes, thereby changing the focal length. This effect is known as electrowetting.

Generally, a liquid lens can focus between about −10 diopters to about +30 diopters. The focus of a liquid lens can be made quickly, even with substantial changes in focus. For instance, some liquid lenses autofocus in tens of milliseconds or faster. Liquid lenses can focus from about 10 cm to infinity and can have an effective focal length of about 16 mm or shorter.

In another example, the variable focus lens 180 is a movable lens controlled by a stepping motor, a voice coil, an ultrasonic motor, or a piezoelectric actuator. Additionally, or as an alternative to moving the variable focus lens 180, a stepping motor can move the image sensor array 186. In such examples, the variable focus lens 180 and/or the image sensor array 186 are oriented normal to an optical axis of the camera 104 and move along the optical axis.

The camera 104 includes an illumination light-emitting diode (LED) 182. The illumination LED 182 is in communication with the computing device 2100, which can coordinate the operation of the illumination LED 182 with adjustments of the variable focus lens 180 for capturing fundus images of the patient P's eyes.

The illumination LED 182 can be single color or multicolor. For example, the illumination LED 182 can be a three-channel RGB LED, where each die is capable of independent and tandem operation. The illumination LED 182 can include white LED (visible light LED) and Infrared (IR) LED. The visible light LED is for capturing a color fundus image. The IR LED is for previewing the fundus when focusing and locating the fundus field of view, and while minimizing disturbance of the patient P's eyes.

In additional examples, the illumination LED 182 can also include a near-infrared LED. The near-infrared LED can be illuminated during a preview mode. For example, the illumination LED 182 is an assembly including one or more visible light LEDs and a near-infrared LED. The near-infrared LED can be used in the preview mode, for example, for the clinician C to determine or estimate the patient's P eye focus without illuminating visible light that could cause the pupil to contract or irritate the patient P.

The camera 104 can also include a fixation LED 184. The fixation LED 184 is in communication with the computing device 2100 and produces a light to guide the patient's P eye for alignment. The fixation LED 184 can be a single color or multicolor LED. For example, the fixation LED 184 can produce a beam of green light that appears as a green dot when the patient P looks into the housing 102. Other colors and designs are possible.

The camera 104 also includes an image sensor array 186 that receives and processes light reflected by the patient P's eye fundus. The image sensor array 186 can be, for example, a complementary metal-oxide semiconductor (CMOS) sensor array, also known as an active pixel sensor (APS), or a charge coupled device (CCD) sensor. The image sensor array 186 includes photodiodes that have a light-receiving surface and have substantially uniform length and width. During exposure, the photodiodes convert the incident light to a charge.

FIGS. 3-13 show an example of the housing 102 of the fundus imager 100. As described above, the housing 102 supports the computing device 2100, camera 104, and display 108. As shown in FIGS. 3-13, the housing 102 supports the display 108 at a first end 202. The housing 102 further includes an opposite, second end 204 configured to engage the face of the patient P (see FIG. 12). The housing 102 is sized and shaped to be handheld and portable.

The display 108 is configured to display the captured fundus images of the left and right eyes of the patient P. Additionally, the display 108 may also be configured to display controls for capturing the fundus images in examples where the display 108 is a touchscreen. The housing 102 can additionally support one or more user input buttons near display 108. The display 108 can be used to initiate the image capture sequence, as described herein. Thus, the fundus imager 100 is configured such that the clinician C can implement one or more automatic and/or manual workflows for the capture of fundus images of the patient P's eyes.

Figure 4:
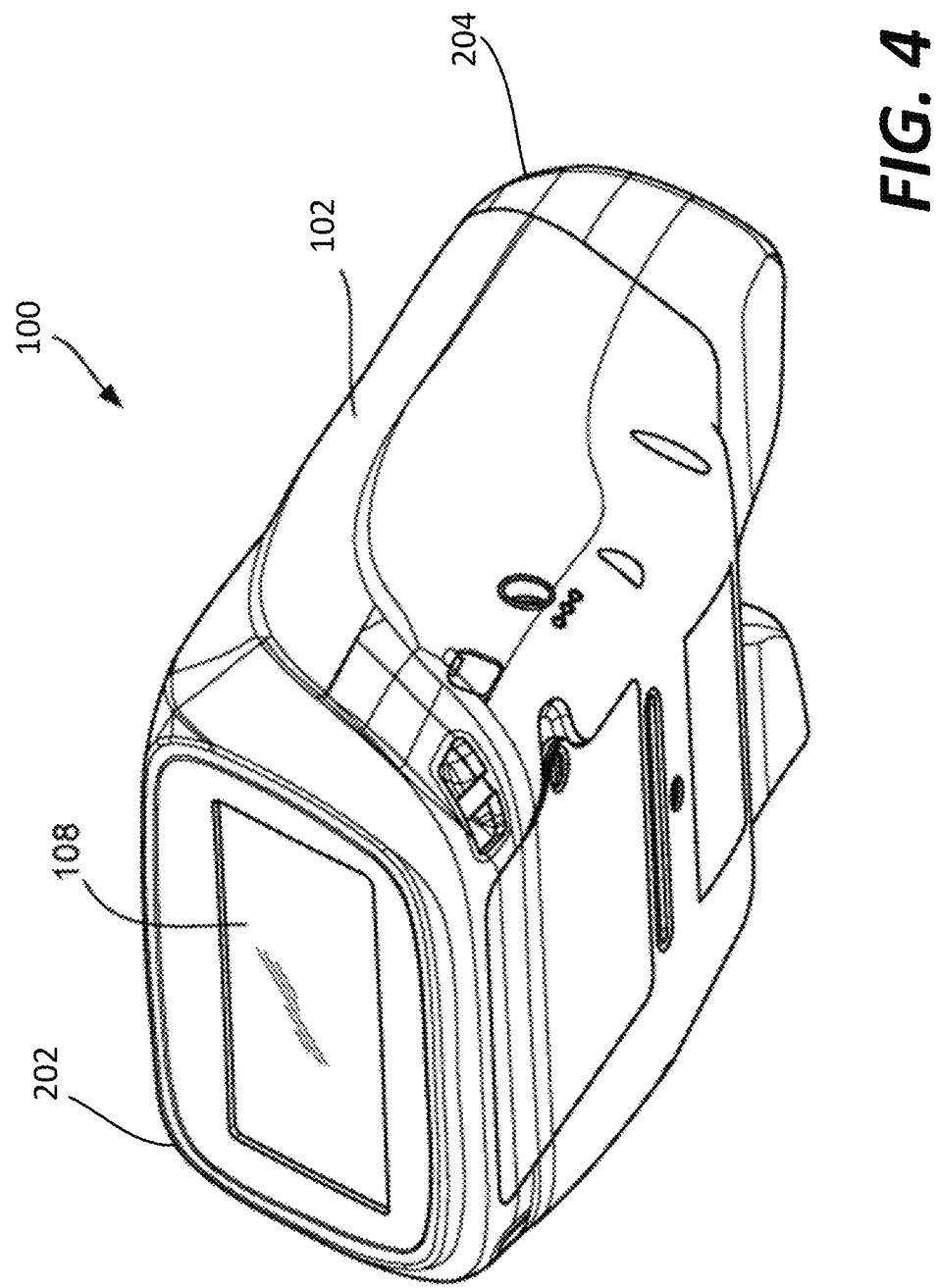
FIG. 4 is a bottom isometric view of the fundus imager of FIG. 1, from the perspective of a clinician.
Figure 5:
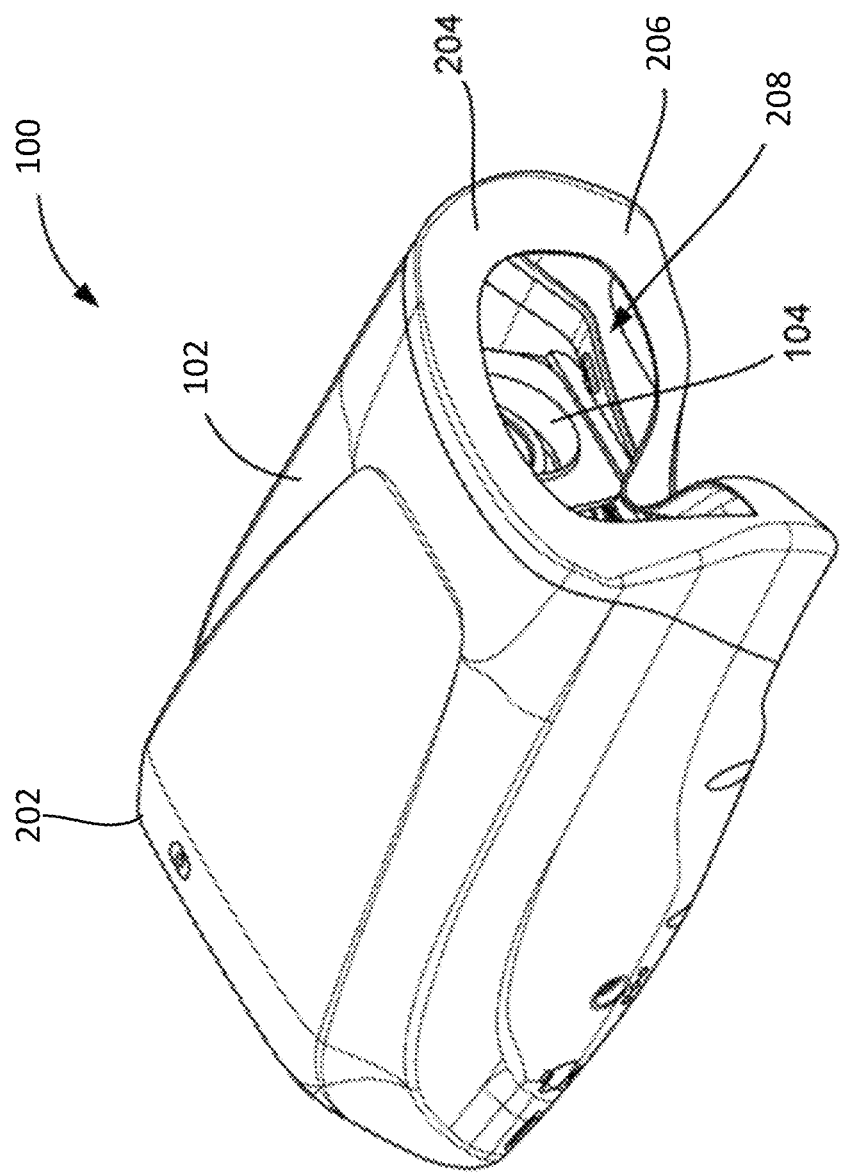
FIG. 5 is another top isometric view of the fundus imager of FIG. 1, from the perspective of a patient.
Figure 6:
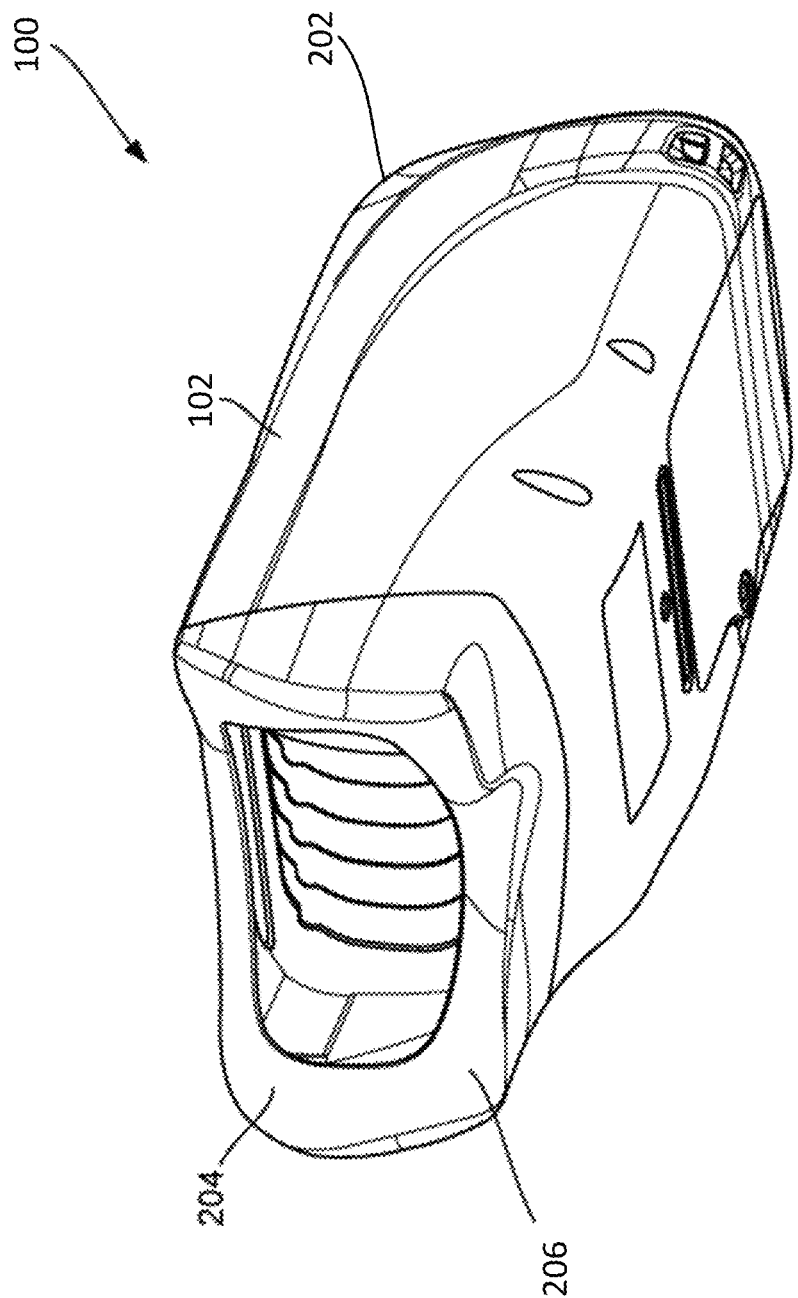
FIG. 6 is another bottom isometric view of the fundus imager of FIG. 1, from the perspective of a patient.
Figure 7:
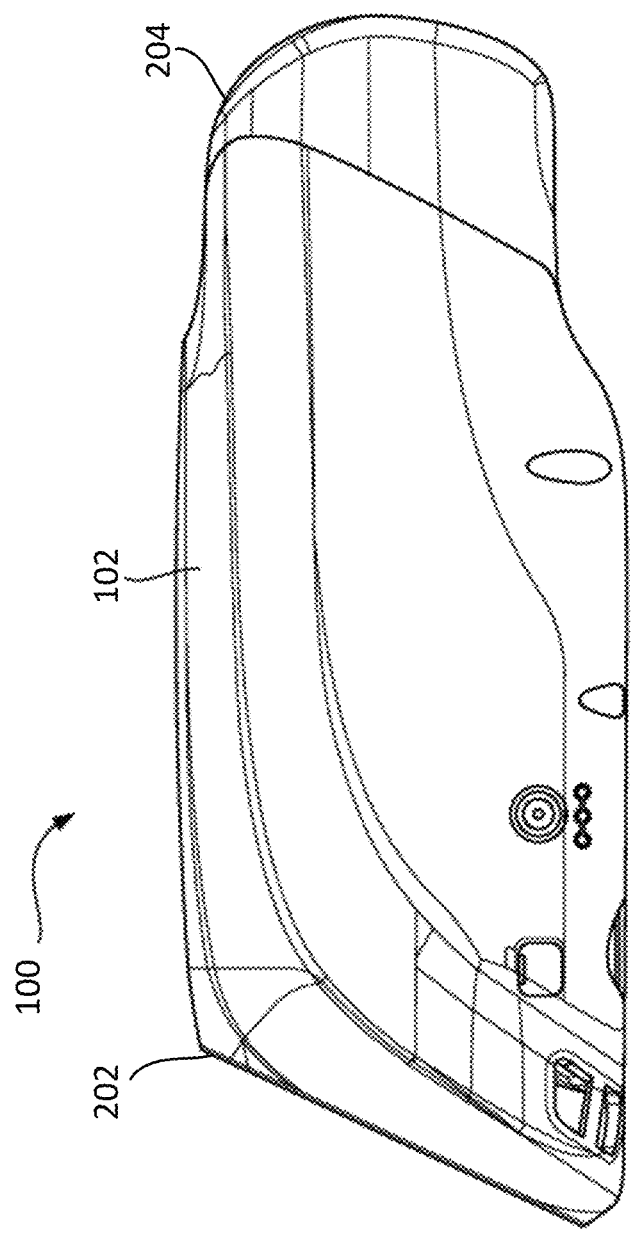
FIG. 7 is a left side view of the fundus imager of FIG. 1.
Figure 8:
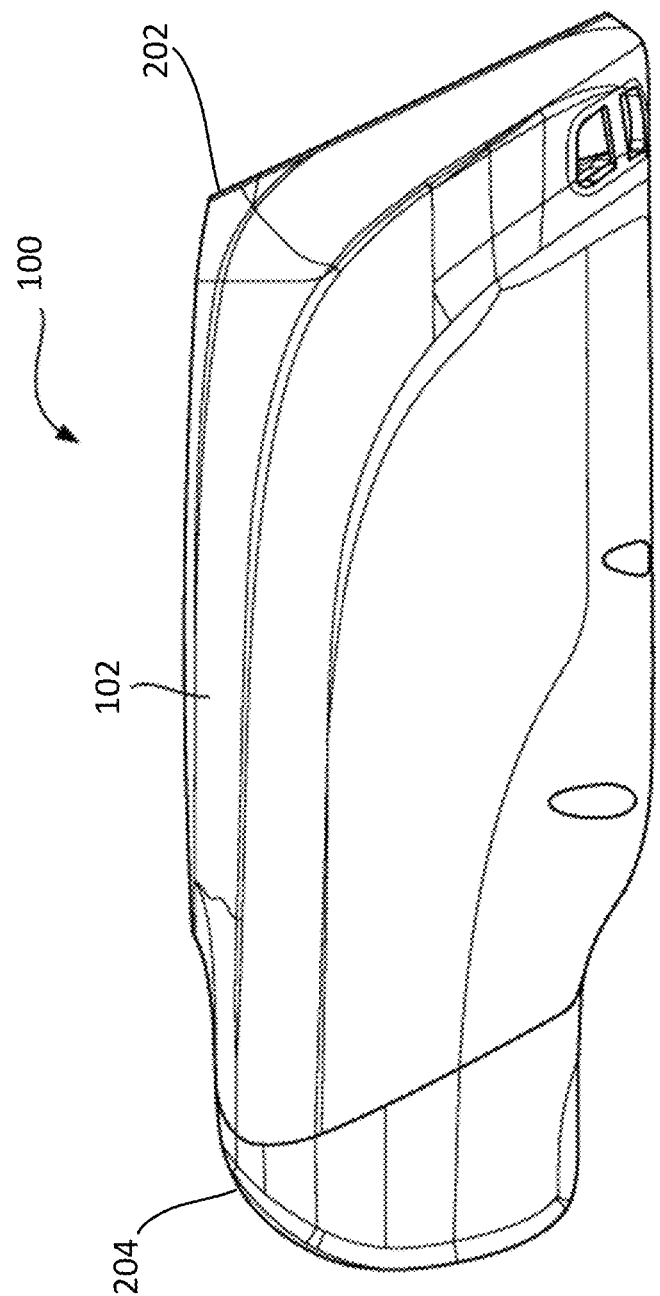
FIG. 8 is a right side view of the fundus imager of FIG. 1.
Figure 9:
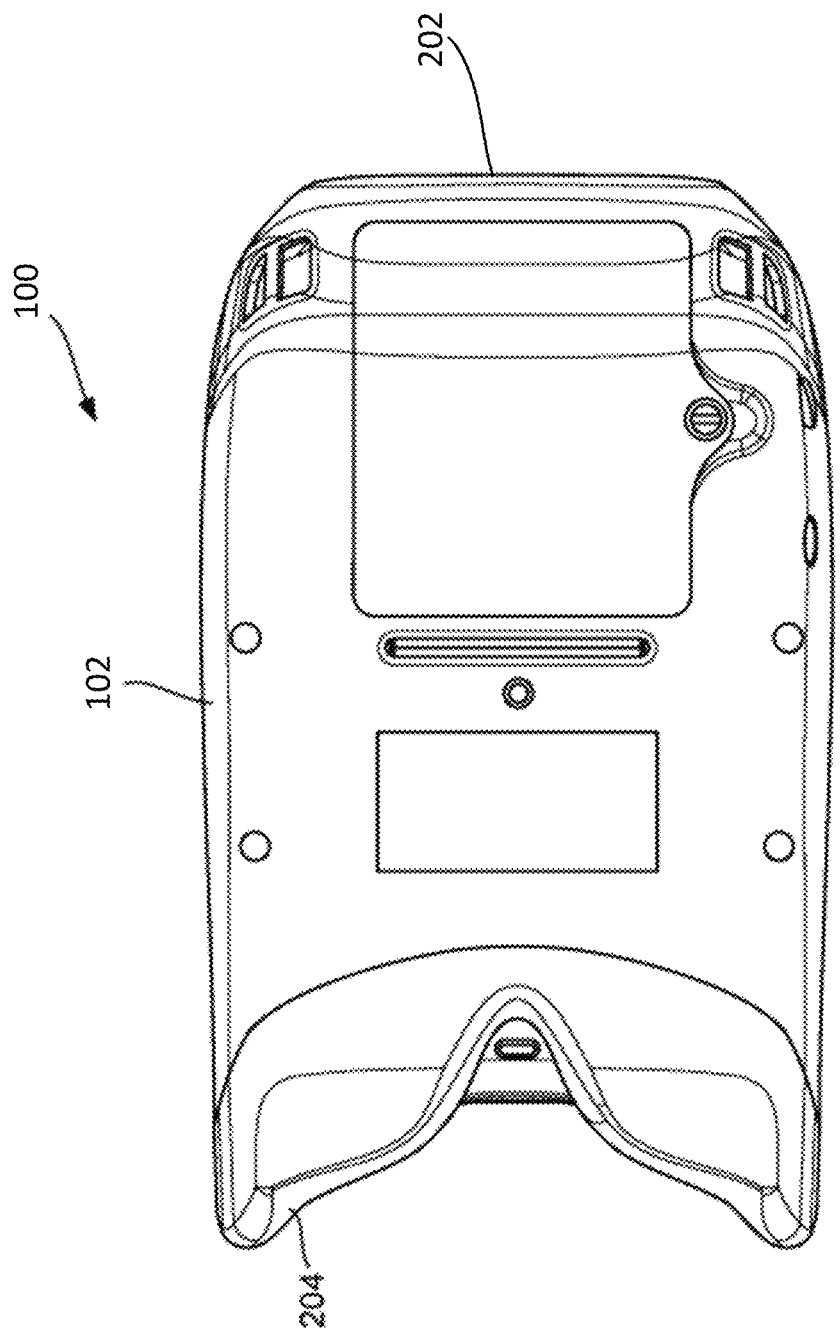
FIG. 9 is a bottom view of the fundus imager of FIG. 1.
Figure 10:
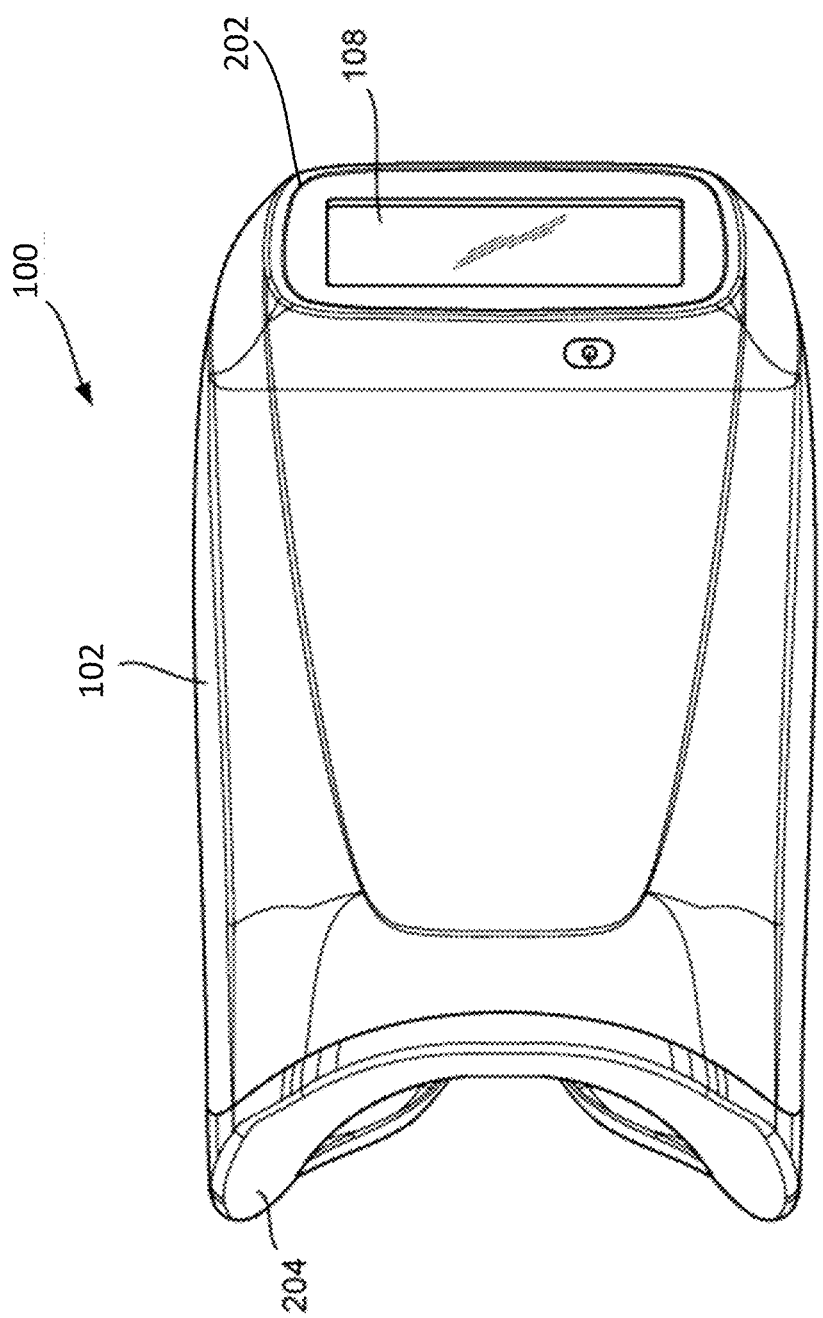
FIG. 10 is a top view of the fundus imager of FIG. 1.
Figure 11:
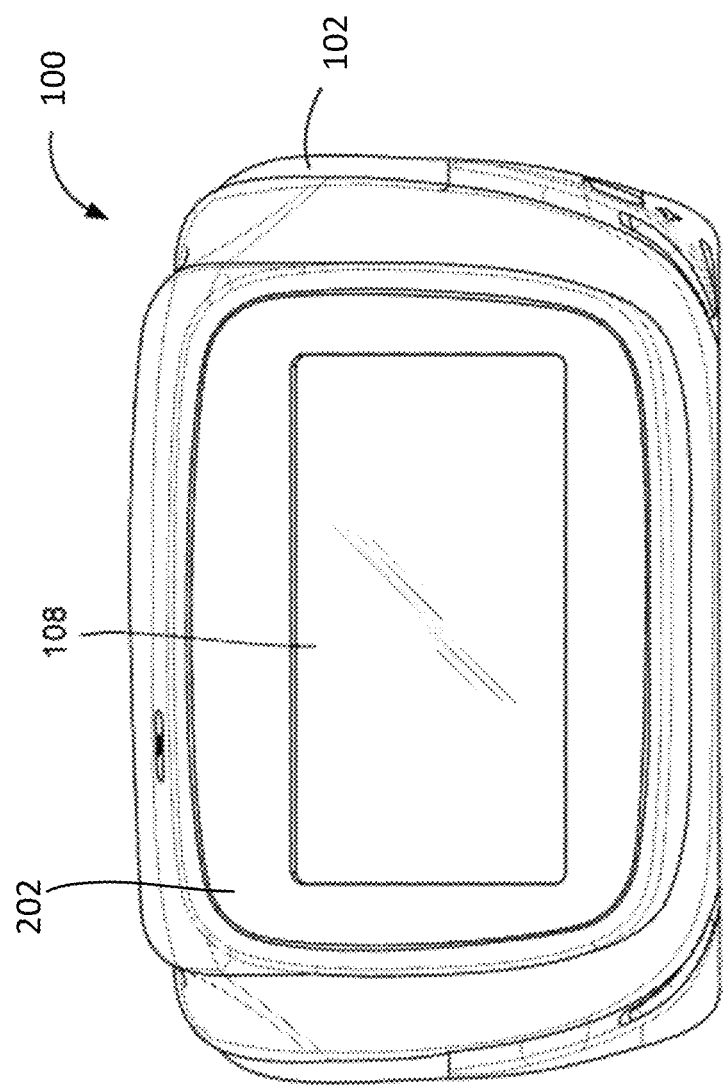
FIG. 11 is a front view of the fundus imager of FIG. 1.
Figure 12:
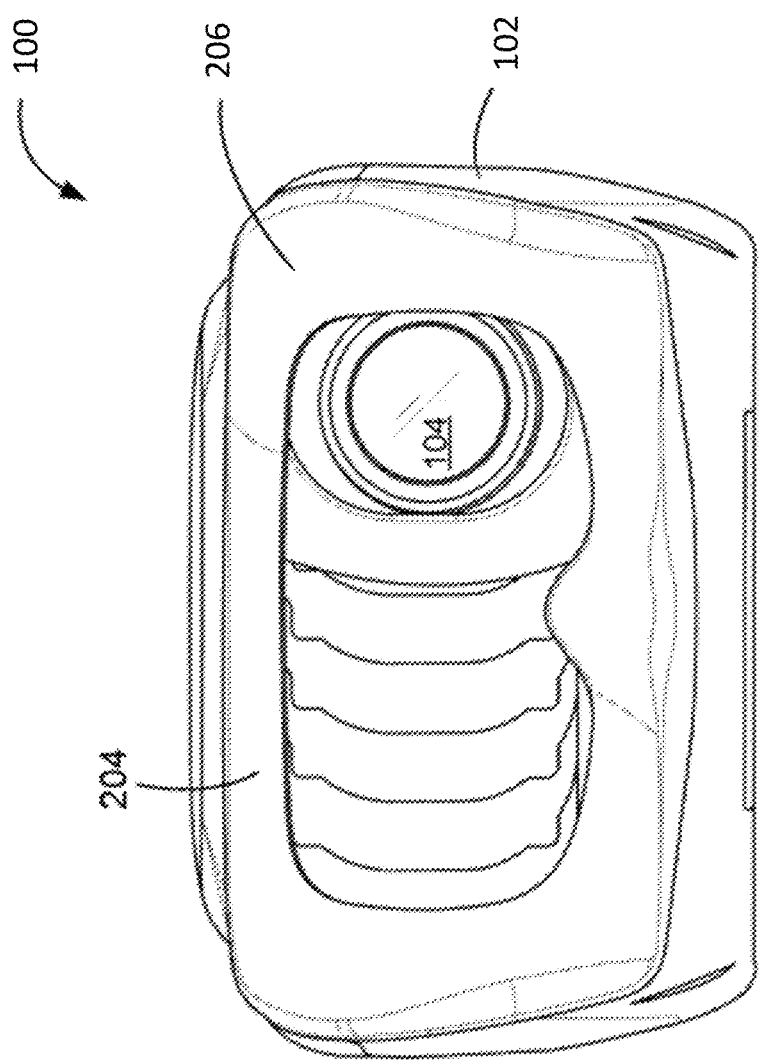
FIG. 12 is a rear view of the fundus imager of FIG. 1.
Figure 13:
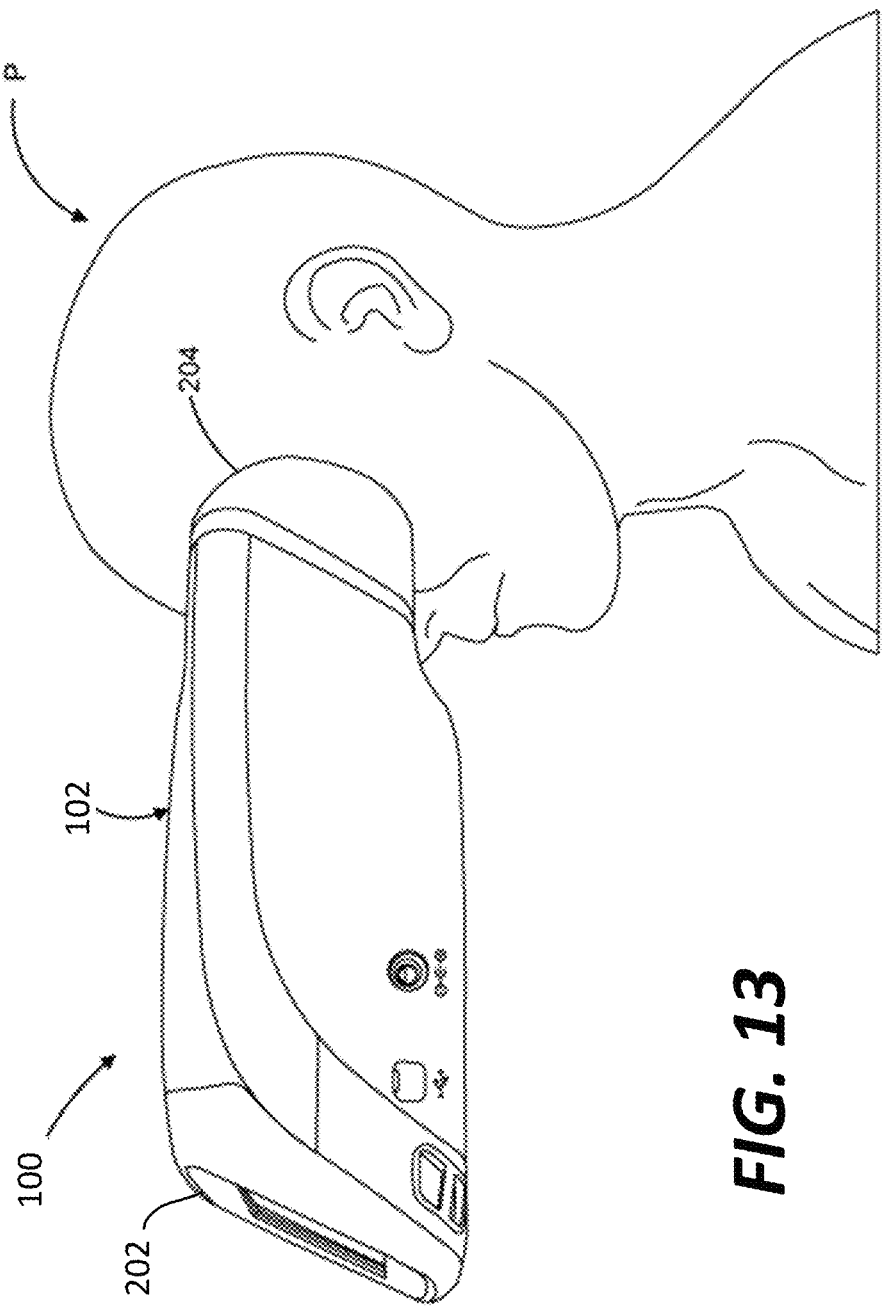
FIG. 13 is a side view showing the fundus imager of FIG. 1 positioned against the patient's face.

As shown in FIGS. 4 and 11, the second end 204 of the housing 102 includes a surface 206 for engaging the patient P's head. For example, the surface 206 can be positioned again the patient P's face and to surround both eyes of the patient P, as shown in FIG. 12.

The housing 102 further defines a cavity 208 at the second end 204. The camera 104 is partially positioned within the cavity 208, and is configured to be moved in at least three directions to accomplish fundus imaging of both the left and right eyes of the patient P while the housing 102 of the fundus imager 100 is positioned and held against the patient P's face.

As described above, in addition to capturing one or more fundus images of the eye, the fundus imager 100 can additionally measure one or more vital signs of the patient P during an eye exam. As will be described in more detail, the fundus imager 100 can extrapolate the one or more vital signs from a sequence of the eye fundus images using video motion magnification. The sequence of the eye fundus images include a livestream or captured video of the eye fundus.

Video motion magnification, also known as video magnification or motion amplification, is a video-processing method that detects subtle motion and amplifies that motion to a level visible to the naked eye. The process decodes light to pull out information that is indicative of motion, even if that motion is too small for a camera to detect with normal methods. For example, video motion magnification models quantization of pixel interpolation, which reveals sub-level values that are the result of sub-pixel motion. Video motion magnification can produce a periodic color variation that is indicative of motion amplified over time to generate a signal that can be used to calculate one or more parameters such as a pulse.

Figure 14:
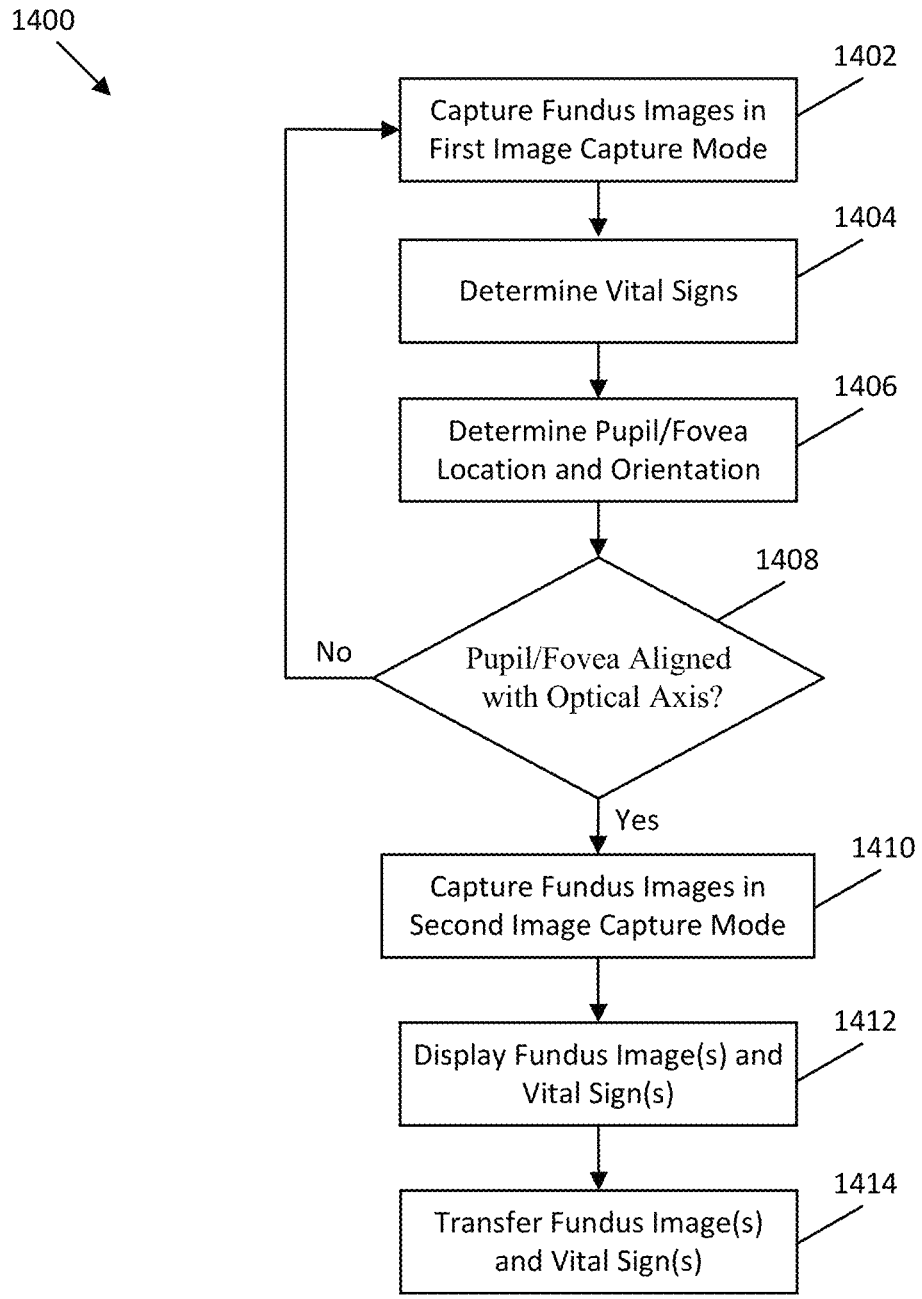
FIG. 14 illustrates an example of a method of eye disease screening performed by the fundus imager of FIG. 1.

FIG. 14 illustrates an example of a method 1400 of eye disease screening performed by the fundus imager 100. The method 1400 includes an operation 1402 of capturing fundus images of an eye of the patient P in a first image capture mode. The fundus images captured in the first image capture mode can be used by the fundus imager 100 to monitor the location and orientation of the pupil or fovea of the eye of the patient P, as described in more detail below.

In the first image capture mode, the fundus imager 100 captures images at a higher frame rate, with infrared or near-infrared illumination, and at lower resolutions. The infrared or near-infrared illumination can be created by the illumination LED 182 of the camera 104 illuminating light of a lower intensity towards the eye of the patient P.

The first image capture mode may minimize discomfort to the patient P, allow the patient P to relax, and allow for a larger pupil size without dilation (non-mydriatic). Additionally, the first image capture mode can reduce external influences on the patient P's vital signs such as due to the patient's anxieties related to being in a medical environment, which can cause abnormal fluctuations in the patient's vital signs such as heart rate and blood pressure.

Next, the method 1400 includes an operation 1404 of determining one or more vital signs of the patient P by processing at least a portion of the fundus images captured in the first image capture mode. Operation 1404 can include determining at least one of heart rate, blood pressure, and SpO2. Operation 1404 will be described in more detail further below.

Next, the method 1400 includes an operation 1406 of determining the location and orientation of the pupil or fovea or both of the eye of the patient P by processing at least a portion of the fundus images captured in the first image capture mode. Using the location of the pupil or fovea or both in at least one of the fundus images captured in the first image capture mode, a vector corresponding to the pupil/fovea orientation can be calculated.

Next, the method 1400 includes an operation 1408 of comparing the pupil/fovea orientation to an optical axis of the camera 104. When the pupil/fovea orientation is substantially aligned with the optical axis of the camera 104 (i.e., "Yes" at operation 1408), the method 1400 can proceed to operation 1410 to capture one or more fundus images in a second image capture mode. When it is not (i.e., "No" at operation 1408), the method 1400 returns to operation 1402 to continue to monitor the location and orientation of the pupil or fovea of the eye of the patient P.

At operation 1410, one or more fundus images are captured in the second image capture mode. In some examples, the camera 104 captures the one or more fundus images in the second image capture mode with visible (or white) illumination and at higher resolutions. The visible illumination is created by the illumination LED 182 operating to generate and direct light of a higher intensity towards the patient P. The second image capture mode may facilitate capturing a clear, well-illuminated, and detailed fundus image.

Next, the method 1400 includes can include an operation 1412 of displaying at least one fundus image captured in the second image capture mode in operation 1410, along with one or more vital signs of the patient P that were determined in operation 1404. A fundus image and vital signs can be displayed together on the same graphical user interface or screen that is generated by the computing device 2100 on the display 108 of the fundus imager 100. Thus, the clinician C can view in a single screen on the display 108 both a fundus image and one or more vital signs of the patient P that were measured during the capture of the fundus image. In some examples, one or more computer implemented algorithms are executed by the computing device 2100 to provide a recommended diagnosis based on the eye fundus images and vital signs.

The method 1400 can include in some examples an operation 1414 of transferring the fundus images and vital signs of the patient P to another device. In some examples, operation 1414 includes uploading the fundus images and vital signs to the remote server 300 via a connection to the network 110 (see, for example, FIG. 1). In such examples, the remote server 300 can store the fundus images and vital signs in the electronic medical record 402 of the patient P located in the EMR system 400. An overread clinician, such as an optometrist or ophthalmologist, can then access the fundus images and vital signs to provide a diagnosis. In some further examples, computer implemented algorithms are executed by the remote server 300 to provide an automated diagnosis based on the eye fundus images and vital signs.

The vital signs extrapolated from the eye fundus video can be used to provide a more comprehensive eye disease diagnosis. Thus, there are advantages for displaying the eye fundus images together with the extrapolated vital signs on the display 108, and/or storing the eye fundus images together with the extrapolated vital signs in the electronic medical record 402 of the patient P. For example, during an eye exam in which the eye fundus images reveal that the patient P has retinopathy, a high blood pressure combined with a low heart rate can be indicative that the patient P has hypertensive retinopathy instead of diabetic retinopathy.

Thus, the vital signs obtained from the eye fundus video can aid the clinician C who operates the fundus imager 100, and can also aid an overread physician who accesses the patient P's electronic medical record 402, to provide a more comprehensive manual diagnosis. Also, the vital signs obtained from the eye fundus video can aid computer implemented algorithms, performed on the fundus imager 100 and/or remote server 300, to provide an automated or preliminary diagnosis that distinguishes between hypertensive and diabetic retinopathy.

Additionally, acquiring the vital sign measurements from the fundus imager 100 during an eye exam can reduce variables such as by having to use different medical devices to obtain the vital signs, and having to measure the vital signs either before the eye exam or after the eye exam, but not during the eye exam. Thus, the vital signs acquired from the fundus images can reduce errors and inconsistencies in the patient vital signs measurements.

Referring now to operation 1404 of determining one or more vital signs of the patient P, video motion magnification is applied to at least a portion of the fundus images captured in the first image capture mode. While operation 1404 is shown in FIG. 14 as occurring before operation 1406, the order of operations 1404-1410 may vary. For example, operation 1404 may occur after operation 1406, after operation 1408, or after operation 1410.

The portion of the fundus images captured in the first image capture mode is a sequence of the fundus images such as a video of the fundus captured over a duration of time. As an illustrative example, the duration of the video could last approximately 5 seconds.

The video motion magnification creates a visual representation of a pulse as it travels through the retinal blood vessels and optic disc of the eye. For example, a periodic color variation that is indicative of motion is amplified over time to generate a signal that can be used to calculate a pulse. The video motion magnification can detect a color variation in the retinal blood vessels and optic disc over time as the blood flows into and out of the retina.

Figure 15:
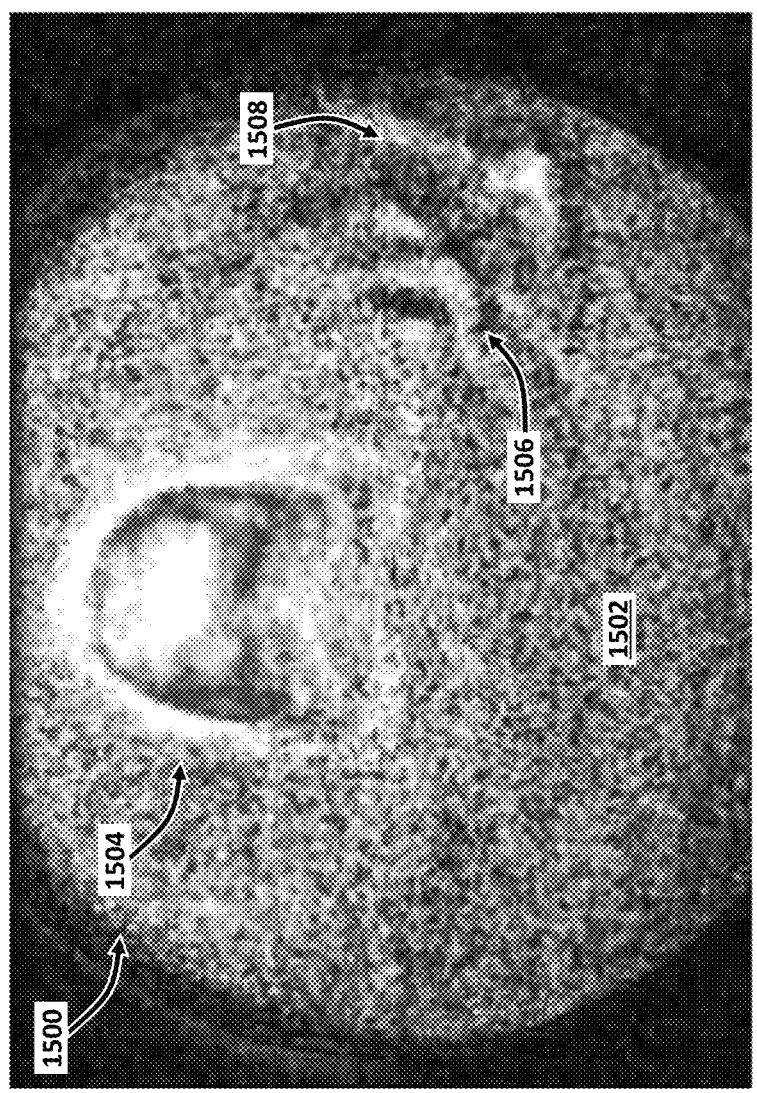
FIG. 15 shows a frame from an image sequence of an eye fundus captured by the fundus imager of FIG. 1.
Figure 16:
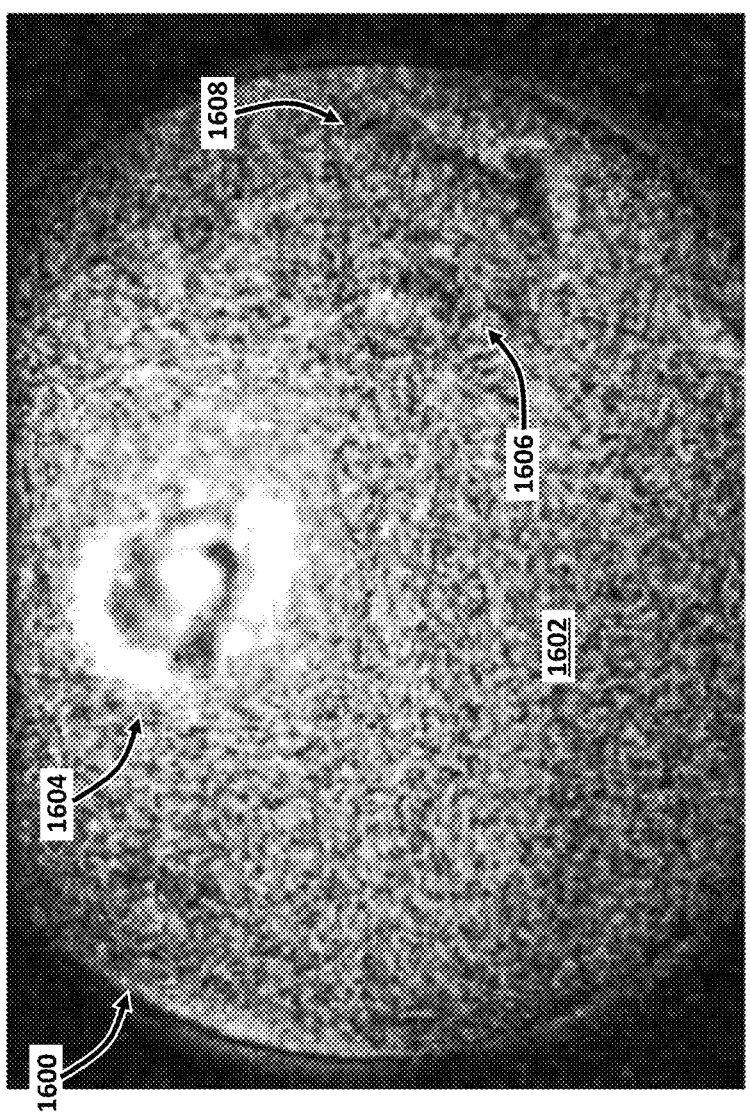
FIG. 16 shows another frame from an image sequence of an eye fundus captured by the fundus imager of FIG. 1.

FIGS. 15 and 16 each show a frame 1500, 1600 from an image sequence of fundus images captured by the fundus imager 100, such as during the first image capture mode of operation 1402. Each frame 1500, 1600 shows the retina 1502, 1602 as having a bright spot 1504, 1604 which is a reflection of the IR LED off the cornea of the eye. Each frame 1500, 1600 further shows the optic disc 1506, 1606 and retinal blood vessels 1508, 1608 of the eye.

In FIG. 15, the optic disc 1506 and retinal blood vessels 1508 are colored differently from the retina 1502. For example, the optic disc 1506 and retinal blood vessels 1508 are colored white, whereas the remaining portion of the retina 1502 is colored pinkish or reddish. Also, the optic disc 1506 and retinal blood vessels 1508 appear in FIG. 15 to be pulsed outwardly such that they appear as ridges that propagate or extend outwardly from the retina 1502.

In FIG. 16, the optic disc 1606 and retinal blood vessels 1608 have a color that matches the color of the retina 1602 (e.g., a pinkish or reddish color) such that the optic disc 1606 and retinal blood vessels 1608 are not distinguishable from the retina 1602. Also, the optic disc 1506 and retinal blood vessels 1508 appear in FIG. 16 to be pulsed inwardly such that they appear level with the retina 1602, and blend in with the remaining portions of the retina.

Also, while not visible in FIGS. 15 and 16, the entire surface of the retina 1502, 1602 may also fluctuate due to the blood being pumped into and out of the retina 1502, 1602 by the optic disc 1506, 1606 and retinal blood vessels 1508, 1608. The fluctuation of the retina 1502, 1602 can be detected using video motion magnification techniques which can display a periodic color variation in the retina 1502, 1602 as the blood is being pumped into and out of it.

Video motion magnification can create a visual representation of the pulse as it travels through the retina 1502, 1602, optic disc 1506, 1606, and retinal blood vessels 1508, 1608. The color variations of the retina 1502, 1602, optic disc 1506, 1606, and retinal blood vessels 1508, 1608 can be tracked over time to generate a signal that corresponds to the pulse of the patient. Thus, the signal obtained from video motion magnification of the fundus images can be used to create a heartbeat wave form, and to also estimate blood pressure and SpO2 levels.

In one example, the blood pressure is estimated using a regression model based on duration, velocity, and magnitude of the heartbeat wave form. In another example, a regression model uses the changes in color of the retina 1502, 1602, optic disc 1506, 1606, and retinal blood vessels 1508, 1608 to estimate SpO2. Also, irregularities in the blood flow can be used to detect retinal vein and artery occlusions. Thus, video motion magnification can be used to extrapolate patient vital signs and additional information from fundus images during a retinal or eye exam.

The video motion magnification, whether performed by the fundus imager 100 or remote server 300, can be configured to filter the signal acquired from the video motion magnification reduce and/or eliminate noise that may result from using the fundus imager 100 to capture the sequence of fundus images. For example, filtering may be performed to remove noise that results from movements of the clinician C's hand when holding the fundus imager 100 against the patient P's face. Additionally, filtering may also be performed to remove noise that results from the patient P moving their eyes such as saccadic eye movements.

In some examples, the video motion magnification and calculation of vital sign estimates such as heart rate, blood pressure, and SpO2 is done by the computing device 2100 on the fundus imager 100. In alternative examples, the fundus imager 100 can transfer raw data such as live fundus streams or captured videos of the fundus to the remote server 300 via the connection to the network 110, and a computing device on the remote server 300 performs the video motion magnification and calculates the vital sign estimates.

Figure 17:
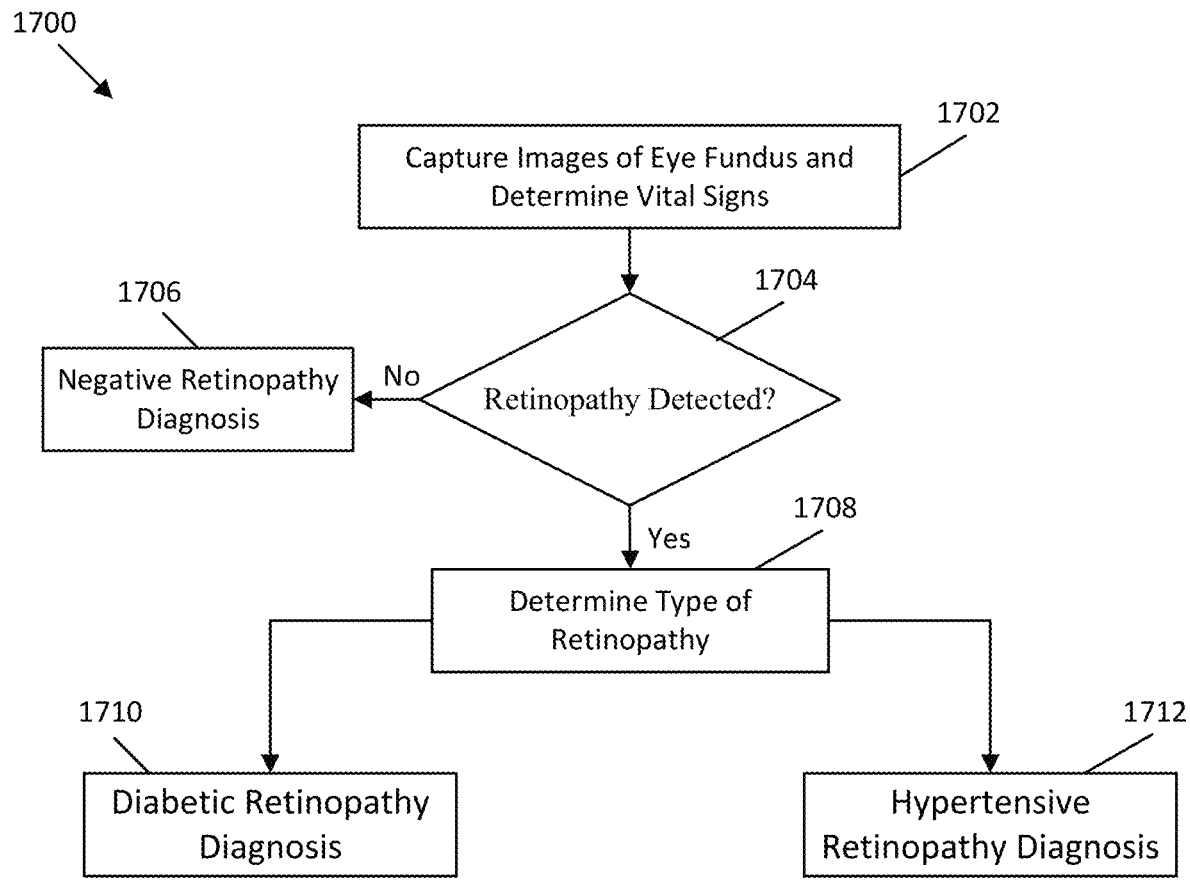
FIG. 17 illustrates another example of a method of eye disease screening performed by the fundus imager of FIG. 1.

FIG. 17 illustrates another example of a method 1700 of eye disease screening performed by the fundus imager 100. The method 1700 includes an operation 1702 which corresponds to operations 1402-1410 of the method 1400. For example, operation 1702 can include capturing an eye fundus video in the first image capture mode (i.e., operation 1402), determining one or more vital signs of the patient P by processing at least a portion of the eye fundus video captured in the first image capture mode, (i.e., operation 1404), and capturing one or more eye fundus images in the second image capture mode (i.e., operation 1410).

Next, the method 1700 includes an operation 1704 of determining whether retinopathy is detected in the one or more images of the eye fundus. Operation 1704 can be performed by scanning the one or more images of the eye fundus for blood vessel damage and ruptures. When retinopathy is not detected (i.e., "No" at operation 1704), the method 1700 proceeds to provide a negative retinopathy diagnosis recommendation in operation 1706. The negative retinopathy diagnosis recommendation can be displayed on the display 108, can be transferred from the fundus imager 100 for display on another device, or can be transferred from the fundus imager 100 for storage in the electronic medical record 402 of the patient P.

When retinopathy is detected (i.e., "Yes" at operation 1704), the method 1700 proceeds to operation 1708 of determining which type of retinopathy. In operation 1708, the type of retinopathy is determined by the vital signs extrapolated from the eye fundus video. For example, a high blood pressure combined with a low heart rate indicates that the patient P is hypertensive, such that the method 1700 provides a hypertensive retinopathy diagnosis recommendation at operation 1712. As another example, when the vital signs indicate that the patient P is not hypertensive, the method 1700 provides a diabetic retinopathy diagnosis recommendation at operation 1710.

The hypertensive or diabetic retinopathy diagnoses can be displayed on the display 108 of the fundus imager 100, can be transferred from the fundus imager 100 for display on another device, or can be transferred from the fundus imager 100 for storage in the electronic medical record 402 of the patient P. Additional alternatives are contemplated.

Figure 18:
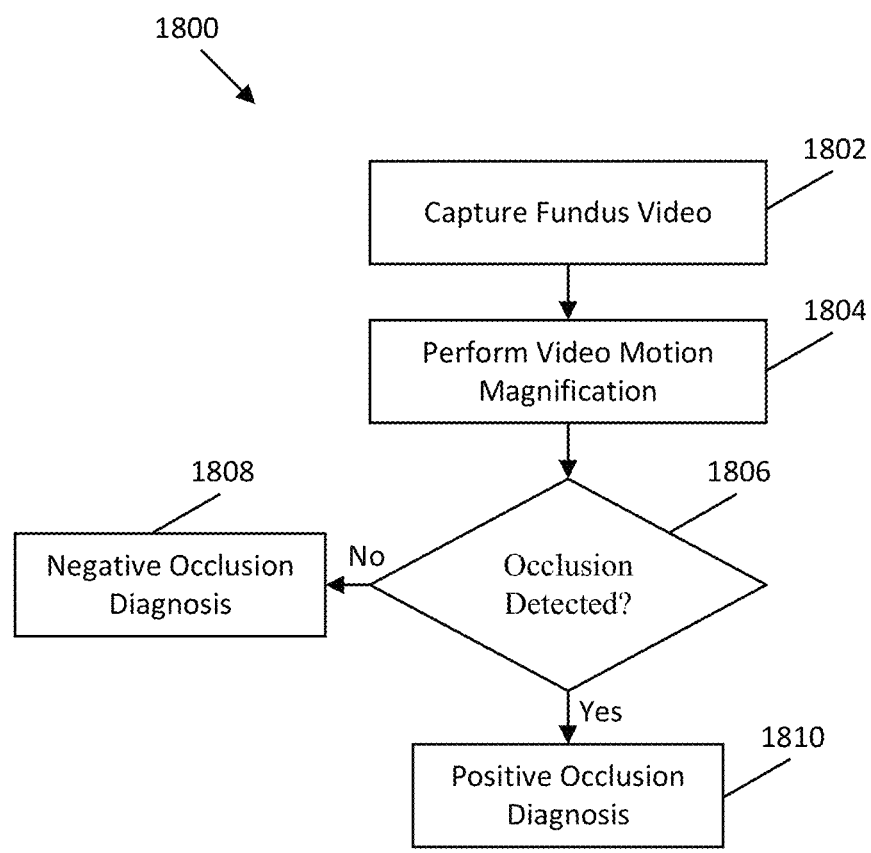
FIG. 18 illustrates another example of a method of eye disease screening performed by the fundus imager of FIG. 1.

FIG. 18 illustrates another example of a method 1800 of eye disease screening performed by the fundus imager 100. The method 1800 includes an operation 1802 of capturing an eye fundus video. In some examples, the eye fundus video is captured according to the first image capture mode described above, with respect to operation 1402 in FIG. 14.

Next, the method 1800 includes an operation 1804 of performing video motion magnification on the captured eye fundus video. The video motion magnification is performed in accordance with the description provided above. The video motion magnification produces a signal that represents the blood flow in the optic disc and retinal blood vessels.

Next, the method 1800 includes an operation 1806 of determining whether retinal vein occlusion is detected. In operation 1806, the signal produced from the video motion magnification in operation 1804 is analyzed to determine whether a retinal blood vessel is blocked. For example, a disturbance in the signal can indicate that a retinal blood vessel is blocked, and can be used to determine whether a retinal vein occlusion is detected.

When retinal vein occlusion is not detected (i.e., "No" at operation 1806), the method 1800 proceeds to provide a negative occlusion diagnosis recommendation in operation 1808. When retinal vein occlusion is detected (i.e., "Yes" at operation 1806), the method 1800 proceeds to provide a positive occlusion diagnosis recommendation in operation 1810.

In some examples, vital signs extrapolated from the fundus images can also contribute to the diagnosis recommendation provided in operations 1808, 1810. For example, retinal vein occlusion is more likely to occur in people with diabetes, and possibly high blood pressure, and other health problems that affect blood flow. Thus, the vital signs extrapolated from the eye fundus video may also help to confirm and/or strengthen confidence in the diagnosis recommendation such as when the vital signs indicate a high blood pressure.

Figure 19:
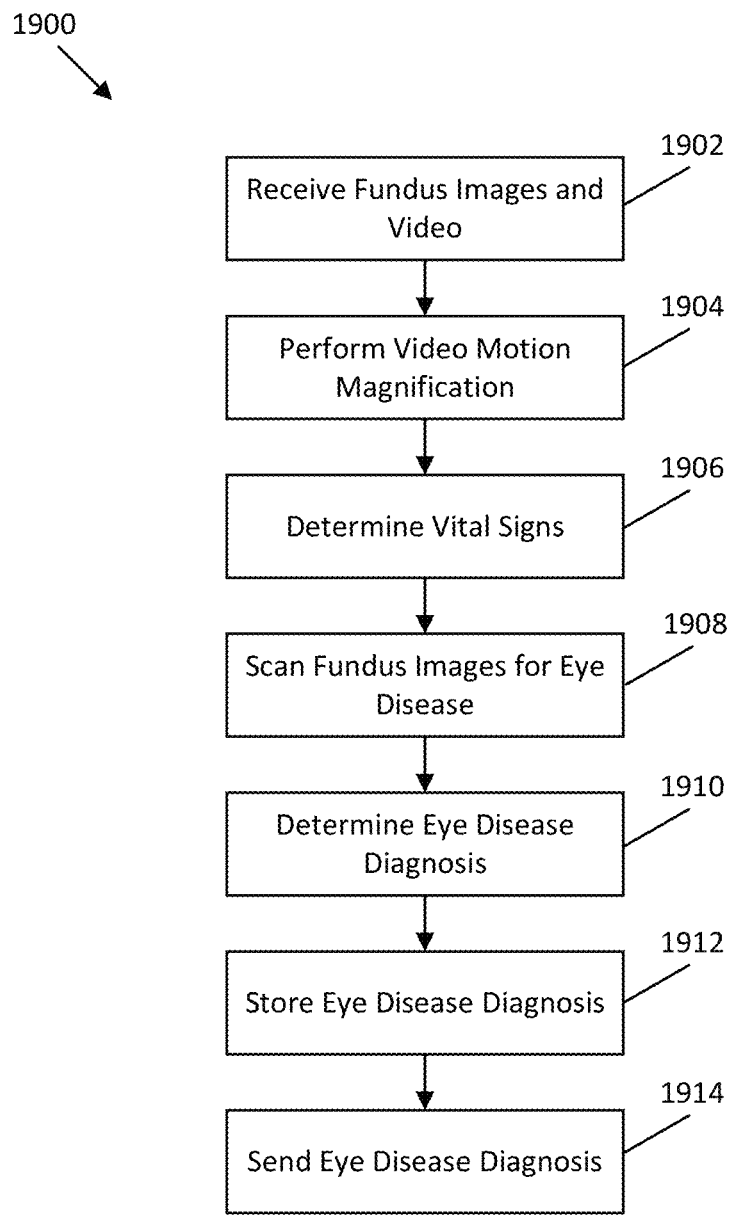
FIG. 19 illustrates another example of a method of eye disease screening performed by a remote server.

FIG. 19 illustrates another example of a method 1900 of eye disease screening. In this example, the method 1400 can be performed by the remote server 300. The method 1900 includes an operation 1902 of receiving fundus images of the patient P. In some examples, the remote server 300 receives the fundus images directly from the fundus imager 100 via the connection to the network 110. Alternatively, the remote server 300 can receive the fundus images from the electronic medical record 402 of the patient P in the EMR system 400.

The fundus images received in operation 1902 include an eye fundus video, such as one recorded according to the first image capture mode (e.g., operation 1402 of the method 1400). The fundus images received in operation 1902 further include one or more eye fundus images according to the second image capture mode (e.g., operation 1410 of the method 1400).

Next, the method 1900 includes an operation 1904 of performing video motion magnification on the fundus images captured according to the first image capture mode. The video motion magnification is performed by the remote server 300 in accordance with the techniques described above to generate a signal that can be used to create a heartbeat waveform.

Next, the method 1900 includes an operation 1906 of determining one or more vital signs from the signal generated from the video motion magnification. For example, the remote server 300 can determine the pulse (i.e., heart rate), blood pressure, and SpO2 of the patient P.

Next, the method 1900 includes an operation 1908 of scanning the fundus images captured according to the second image capture mode for one or more eye diseases. For example, the remote server 300 can scan the fundus images for artifacts or conditions that are symptomatic of retinopathy, macular degeneration, glaucoma, and papilledema.

Next, the method 1900 includes an operation 1910 of providing an eye disease diagnosis recommendation. The remote server 300 can base the eye disease diagnosis recommendation on both the scanning the fundus images in operation 1908 and the vital signs determined in operation 1906. For example, remote server 300 can detect retinopathy from fundus images scanned in operation 1908, and can provide an eye disease diagnosis recommendation that distinguishes between diabetic retinopathy and hypertensive retinopathy depending on the vital signs determined in operation 1906.

The method 1900 can include an operation 1912 of storing the eye disease diagnosis recommendation in the electronic medical record 402 of the patient P. The clinician C who operates the fundus imager 100 can view the eye disease diagnosis recommendation in the electronic medical record 402 of the patient P on another device located in the clinician C's office such as a workstation computer, tablet computer, or smartphone. In another example, the eye disease diagnosis recommendation stored in the electronic medical record 402 of the patient P can be accessed by an overread clinician who can manually confirm the diagnosis.

The method 1900 can also include an operation 1914 of sending the eye disease diagnosis recommendation to another device for viewing by the clinician C. For example, the eye disease diagnosis recommendation determined by the remote server 300 can be sent directly to the fundus imager 100 via the connection to the network 110 for viewing on the display 108. Alternatively, the eye disease diagnosis recommendation determined by the remote server 300 can be sent directly to another device located in the clinician C's office such as a workstation computer, a computer tablet, a smartphone, and the like.

Figure 20:
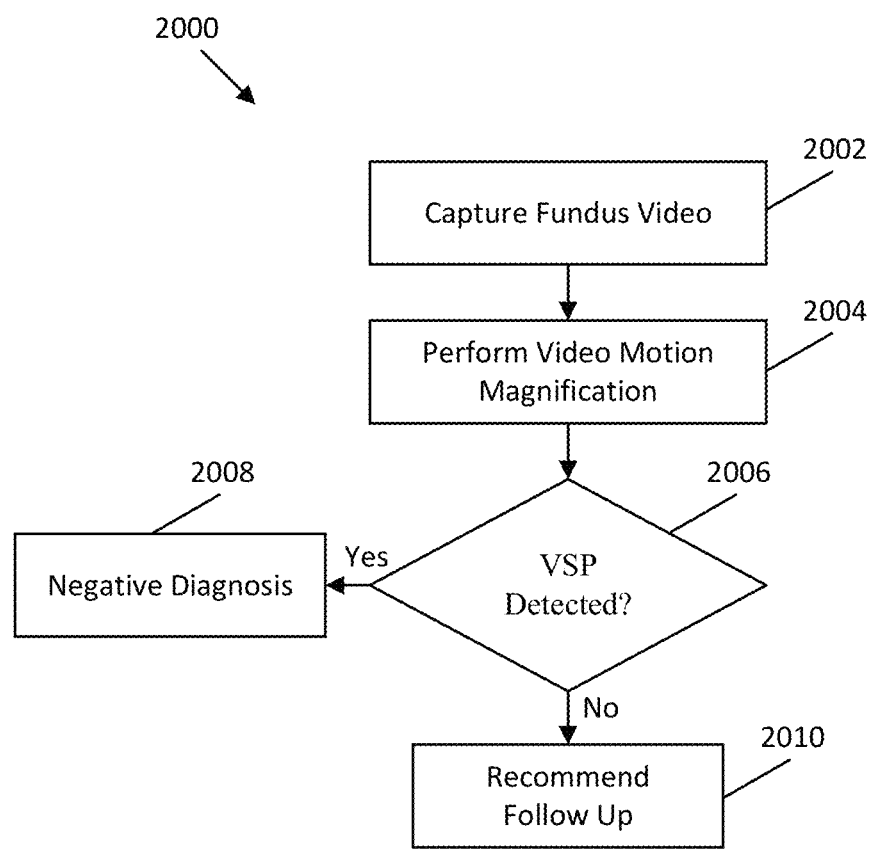
FIG. 20 illustrates an example of a method of screening performed by the fundus imager of FIG. 1.

FIG. 20 illustrates an example of a method 2000 of screening performed by the fundus imager 100. In addition to determining one or more vital signs of the patient P, the fundus imager 100 can perform video motion magnification on an eye fundus video to detect the presence or absence of spontaneous venous pulsation, which is a rhythmic pulsation occurring in the retinal blood vessels as they cross the optic disc. These pulsations are synchronized with the patient's cardiac cycle, such that the size of the retinal blood vessels steadily narrow during the systole phase of the heartbeat and expand during the diastole phase of the heartbeat.

Spontaneous venous pulsation is a physical manifestation of a pressure difference between the subarachnoid space and intraocular space. Typically, the intraocular pressure is greater than the intracranial pressure. However, when there is a rise in intracranial pressure such that it equates to the intraocular pulse pressure, the spontaneous venous pulsation ceases to occur. About 80% to 90% of normal, healthy eyes exhibit spontaneous venous pulsation, and therefore its absence does not necessarily indicate an underlying pathological condition. However, it's presence can rule out pathological conditions such as papilledema and concussion, and can thus be used to provide a more comprehensive diagnosis.

Increased intercranial pressure can result from hydrocephalus, which is an abnormal buildup of cerebrospinal fluid (CSF), bleeding into the brain, swelling in the brain, aneurysm, blood pooling in some part of the brain, brain or head injury, brain tumor, infections such as encephalitis or meningitis, high blood pressure, and stroke. The method 2000 when performed by the fundus imager 100 can be used to rule out a diagnosis for any one of these pathological conditions when spontaneous venous pulsation is detected, and can be used to provide a recommendation for further follow up when spontaneous venous pulsation is not detected.

Referring now to FIG. 20, the method 2000 includes an operation 2002 of capturing an eye fundus video. In some examples, the eye fundus video is captured in operation 2002 by the fundus imager 100 according to the first image capture mode described above.

Next, the method 2000 includes an operation 2004 of performing video motion magnification on the captured eye fundus video. The video motion magnification is performed in accordance with the description provided above. The video motion magnification produces a signal that represents the blood flow in the optic disc and retinal blood vessels.

Next, the method 2000 includes an operation 2006 of determining whether spontaneous venous pulsation is detected from the signal. In operation 2006, the signal produced from the video motion magnification in operation 2004 is analyzed to determine whether or not spontaneous venous pulsation is present or absent.

When spontaneous venous pulsation is detected (i.e., "Yes" at operation 2006), the method 2000 proceeds to rule out a diagnosis for a pathological condition in operation 2008 (i.e., the method 2000 provides a negative diagnosis). In some examples, the negative diagnosis is for papilledema. In some examples, the negative diagnosis is for a concussion.

When spontaneous venous pulsation is not detected (i.e., "No" at operation 2006), the method 2000 proceeds to provide a recommendation for further follow up in operation 2010. As described above, about 20% to 10% of normal, healthy eyes do not exhibit spontaneous venous pulsation. Therefore, the absence of spontaneous venous pulsation can mean that the patient P is at risk for a pathological condition such as papilledema or a concussion, but it is not definitive.

Thus, operation 2010 can provide a recommendation for follow up such as for additional analysis or tests to confirm whether or not the pathological condition exists. In the case of papilledema, one or more eye fundus images can be scanned to detect for additional characteristics to confirm a positive diagnosis for papilledema. In the case of concussion, one or more additional tests may be performed to confirm a positive diagnosis for a concussion.

In addition to the foregoing, it is contemplated that additional values, such as interocular pressure and blood pressure, can be determined from one or more fundus images captured from the fundus imager 100. The interocular pressure and blood pressure are then input into a computer implemented algorithm to calculate intercranial pressure. Thus, the fundus imager 100 can be used to calculate intercranial pressure, which is helpful to detect traumatic brain injury such as after a car accident, and can speed up life saving interventions.

Figure 21:
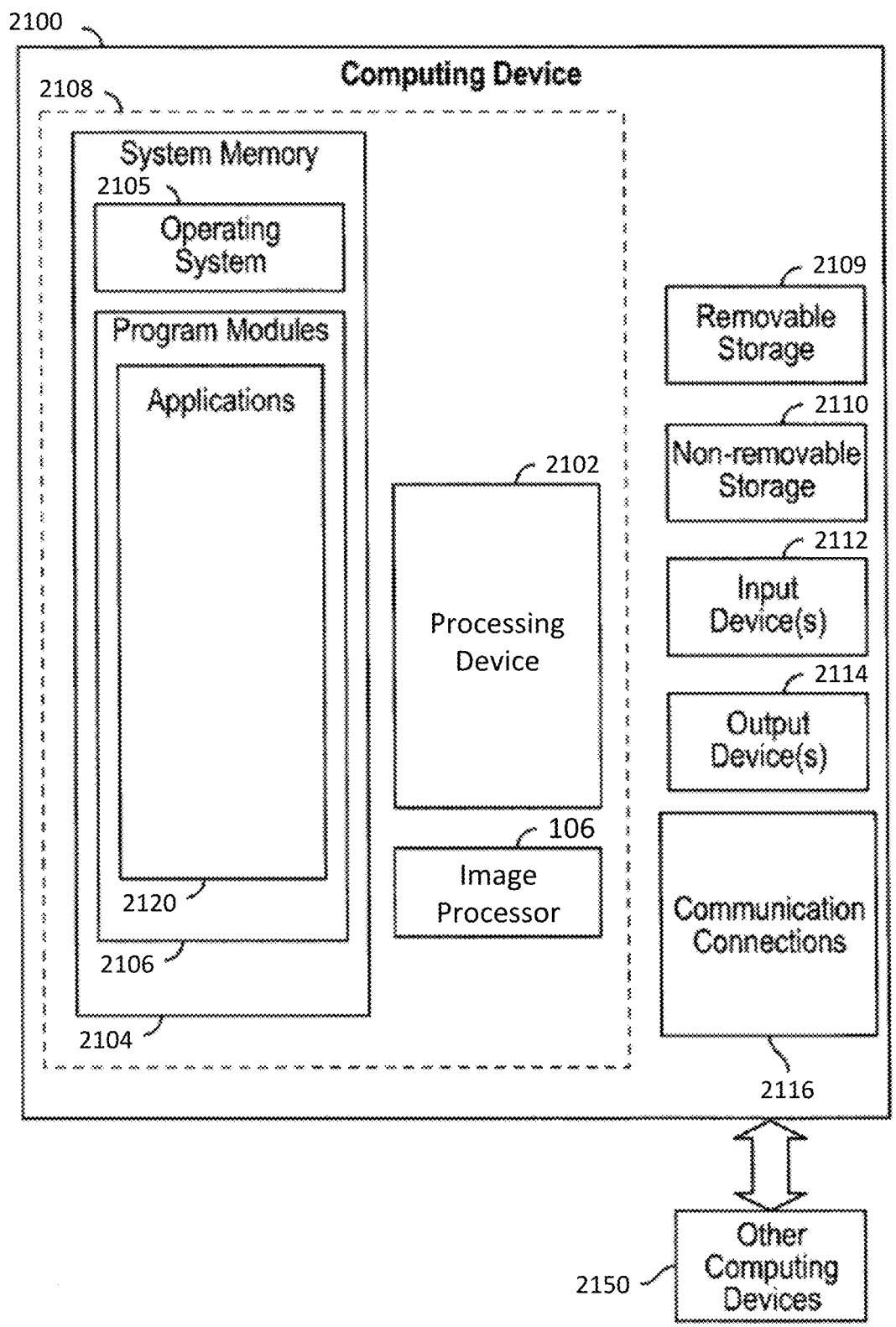
FIG. 21 schematically illustrates an example of a computing device of the fundus imager of FIG. 1.

FIG. 21 schematically illustrates an example of the computing device 2100 of the fundus imager 100, with which the various methods, functions, and features of the present disclosure may be practiced. The computing device 2100 includes the image processor 106, and at least one processing device 2102 that can be used, either separately or in combination with the image processor 106, to regulate the operation of the camera 104, display 108, lighting unit 112, spectral filters 114, and other components of the fundus imager 100.

The computing device 2100 further includes a system memory 2104. The system memory 2104 may comprise, but is not limited to, volatile storage (e.g., random access memory), non-volatile storage (e.g., read-only memory), flash memory, or any combination of such memories. The system memory 2104 may include an operating system 2105 and one or more program modules 2106 suitable for running software applications 2120. The operating system 2105, for example, may be suitable for controlling the operation of the fundus imager 100.

Furthermore, embodiments of the disclosure may be practiced in conjunction with a graphics library, other operating systems, or any other application program and is not limited to any particular application or system. This basic configuration is illustrated in FIG. 21 by those components within a dashed line 2108. The computing device 2100 may have additional features or functionality. For example, the computing device 2100 can include additional data storage devices, including a removable storage device 2109 and a non-removable storage device 2110.

Embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the present disclosure may be practiced via a system-on-a-chip (SOC) where each or many of the components illustrated in FIG. 21 may be integrated onto a single integrated circuit. When operating via an SOC, the functionality, described herein, may be operated via application-specific logic integrated with other components of the computing device 2100 on the single integrated circuit.

The computing device 2100 can be connected to one or more input device(s) 2112, such as the display 108 when configured as a touchscreen. Also, the computing device 2100 can be connected to one or more output device(s) 2114 such as the display 108, speakers, and the like. The computing device 2100 can be connected to additional input/output devices.

The computing device 2100 may include one or more communication connections 2116 allowing communications with other computing devices 2150, and with the network 110. Examples of communication connections 2116 include RF transmitter, receiver, and/or transceiver circuitry; universal serial bus (USB), parallel, and/or serial ports.

The term computer readable storage device as used herein may include non-transitory computer storage media. Computer storage media may include volatile and nonvolatile, removable and non-removable media implemented in any method or technology for storage of information, such as computer readable instructions, data structures, or program modules. The system memory 2104, the removable storage device 2109, and the non-removable storage device 2110 are all examples of computer readable storage devices. Computer readable storage devices may further include RAM, ROM, electrically erasable read-only memory (EEPROM), flash memory or other memory technology, or any article of manufacture which can be used to store information and which can be accessed by the computing device 2100. Additionally, any such computer readable storage devices may be considered part of the computing device 2100.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, radio frequency (RF), infrared, and other wireless media.

Embodiments of the present invention may be utilized in various distributed computing environments where tasks are performed by remote processing devices, such as one or more devices linked through the network 110 in a distributed computing environment.

The block diagrams depicted herein are just examples. There may be many variations to these diagrams described therein without departing from the spirit of the disclosure. For instance, components may be added, deleted or modified.

The systems and method described herein result in a significant technical advantage. For example, the fundus imager 100 is programmed to more efficiently detect and/or identify eye diseases using the acquired multispectral fundus images. This allows the fundus imager 100 to more efficiently analyze fundus images for eye disease screening.

The various embodiments described above are provided by way of illustration only and should not be construed to be limiting in any way. Various modifications can be made to the embodiments described above without departing from the true spirit and scope of the disclosure.

What is claimed is:

1. A fundus imager, comprising:
   a camera configured to capture one or more eye fundus images;
   a display configured to display the one or more eye fundus images;
   at least one processing device; and
   at least one computer readable data storage device storing software instructions that, when executed by the at least one processing device, cause the at least one processing device to:
   capture an eye fundus video using the camera;
   perform an analysis on the eye fundus video by tracking temporal changes in color variations of retinal features over time to generate a signal;

calculate one or more vital signs measurements from the signal, the one or more vital signs measurements selected from pulse rate, blood pressure, and SpO2;

determine whether retinopathy is present in an eye fundus image; and when the retinopathy is present in the eye fundus image, use the one or more vital signs measurements to distinguish between a diabetic retinopathy diagnosis and a hypertensive retinopathy diagnosis.

2. The fundus imager of claim 1, wherein the analysis performed on the eye fundus video includes video motion magnification.

3. The fundus imager of claim 1, wherein the software instructions, when executed by the at least one processing device, further cause the at least one processing device to:

capture the eye fundus video using a first image capture mode while tracking a location of a pupil or a fovea of an eye.

4. The fundus imager of claim 3, wherein the software instructions, when executed by the at least one processing device, further cause the at least one processing device to:

capture the eye fundus image using a second image capture mode.

5. The fundus imager of claim 4, wherein the second image capture mode uses a higher resolution than the first image capture mode.

6. The fundus imager of claim 4, wherein the software instructions, when executed by the at least one processing device, further cause the at least one processing device to:

display the eye fundus image and the one or more vital signs measurements together on the display.

7. The fundus imager of claim 4, wherein the software instructions, when executed by the at least one processing device, further cause the at least one processing device to:

store the eye fundus image and the one or more vital signs measurements in an electronic medical record of a patient.

8. A method of eye disease screening, comprising:

capturing an eye fundus video;

performing video motion magnification by tracking temporal changes in color variations of retinal features over time in the eye fundus video;

generating a signal from the video motion magnification;

analyzing the signal for calculation of one or more vital signs measurements selected from pulse rate, blood pressure, and SpO2;

determining whether retinopathy is present in an eye fundus image; and when the retinopathy is present in the eye fundus image, using the one or more vital signs measurements to distinguish between a diabetic retinopathy diagnosis and a hypertensive retinopathy diagnosis.

9. The method of claim 8, further comprising:

capturing the eye fundus image; and displaying the eye fundus image and the one or more vital signs measurements on a single screen.

10. The method of claim 9, further comprising:

scanning the eye fundus image for conditions symptomatic of an eye disease; and when a condition symptomatic of the eye disease is detected, using the one or more vital signs measurements to validate an eye disease diagnosis recommendation.

11. The method of claim 10, further comprising:

storing the eye fundus image, the one or more vital signs measurements, and the eye disease diagnosis recommendation in an electronic medical record of a patient.

12. The method of claim 8, further comprising:

determining a presence of retinal vein occlusion from the video motion magnification.

13. The method of claim 8, further comprising:

analyzing the signal for spontaneous venous pulsation; and rule out a diagnosis for a pathological condition when spontaneous venous pulsation is detected.

14. The method of claim 13, wherein the pathological condition includes at least one of papilledema and concussion.

15. A system comprising:

at least one processing device; and at least one computer readable data storage device storing software instructions that, when executed by the at least one processing device, cause the at least one processing device to:

obtain an eye fundus video;

perform video motion magnification on the eye fundus video by tracking temporal changes in color variations of retinal features over time to generate a signal;

calculate one or more vital signs measurements based on the signal, the one or more vital signs measurements selected from pulse rate, blood pressure, and SpO2;

obtain an eye fundus image;

determine whether retinopathy is present in the eye fundus image; and when retinopathy is present in the eye fundus image, use the one or more vital signs measurements to distinguish between diabetic retinopathy and hypertensive retinopathy.

16. The system of claim 15, wherein the software instructions, when executed by the at least one processing device, further cause the at least one processing device to:

determine a presence of retinal vein occlusion from the video motion magnification.

17. The system of claim 15, wherein the software instructions, when executed by the at least one processing device, further cause the at least one processing device to:

analyze the eye fundus video for spontaneous venous pulsation; and rule out a diagnosis for papilledema or concussion when spontaneous venous pulsation is detected.

* * * * *